US 11,388,312 B2

(12) United States Patent
Kakutani

(10) Patent No.: US 11,388,312 B2
(45) Date of Patent: Jul. 12, 2022

(54) IMAGE PROCESSING APPARATUS AND IMAGE PROCESSING METHOD

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/385,993

(22) Filed: Jul. 27, 2021

(65) Prior Publication Data
US 2022/0038602 A1 Feb. 3, 2022

(30) Foreign Application Priority Data
Jul. 28, 2020 (JP) .............................. JP2020-126933

(51) Int. Cl.
*H04N 1/405* (2006.01)
(52) U.S. Cl.
CPC ................................. *H04N 1/4052* (2013.01)
(58) Field of Classification Search
CPC .................................................. H04N 1/4052
See application file for complete search history.

(56) References Cited

U.S. PATENT DOCUMENTS

| | | | | |
|---|---|---|---|---|
| 8,213,054 B2* | 7/2012 | Suzuki | ................. | H04N 1/4052 358/3.05 |
| 2004/0257623 A1* | 12/2004 | Suzuki | .................. | H04N 1/405 382/284 |
| 2006/0120787 A1* | 6/2006 | Abello | ................. | H04N 1/4052 400/76 |
| 2007/0002382 A1* | 1/2007 | Yamazaki | ............ | H04N 1/4051 358/3.03 |
| 2012/0050814 A1* | 3/2012 | Tanaka | ................. | H04N 1/4052 358/3.03 |

(Continued)

FOREIGN PATENT DOCUMENTS

| | | |
|---|---|---|
| JP | 2020-031313 A | 2/2020 |
| JP | 2020-065100 A | 4/2020 |

*Primary Examiner* — Ted W Barnes
(74) *Attorney, Agent, or Firm* — Global IP Counselors, LLP

(57) ABSTRACT

An original image is divided in a primary scan direction, and an upstream overlapping segment that overlaps with the divided image on the upstream in the primary scan direction is provided from the division position. Halftone processors are provided in correspondence with the divided images, and the pixels on each raster line of each of the divided images are sequentially picked up as a pixel of interest, and an error diffusion method is applied to the pixel of interest. The halftone processor that processes the divided image on the downstream in the primary scan direction out of the plurality of divided images starts, after the halftone processor that processes the upstream divided image performs the halftone processing on a pixel on a raster line, halftone processing on a pixel on the raster line of the divided image to be processed and causes, in the halftone processing, the result of the halftone processing performed on the pixel of interest by a degree specified in advance with the result of halftone processing performed on the corresponding pixel in an upstream overlapping segment of the adjacent upstream divided image.

7 Claims, 16 Drawing Sheets

(56) References Cited

U.S. PATENT DOCUMENTS

| | | | |
|---|---|---|---|
| 2012/0051659 A1* | 3/2012 | Ashida | G06V 10/28 382/251 |
| 2013/0179644 A1* | 7/2013 | Tomi | G06F 12/0808 711/144 |
| 2020/0068091 A1* | 2/2020 | Kakutani | H04N 1/58 |
| 2020/0120234 A1* | 4/2020 | Kakutani | H04N 1/4052 |
| 2022/0038602 A1* | 2/2022 | Kakutani | H04N 1/4052 |

* cited by examiner

IMAGE PROCESSING APPARATUS AND IMAGE PROCESSING METHOD

The present application is based on, and claims priority from JP Application Serial Number 2020-126933, filed Jul. 28, 2020, the disclosure of which is hereby incorporated by reference herein in its entirety.

BACKGROUND

1. Technical Field

The present disclosure relates to a technology for image processing using an error diffusion method.

2. Related Art

To reproduce a multi-gradation image by using a set of dots or pixels having a smaller number of gradations, how to determine the dot arrangement is important to improve the quality of the reproduced image. The technology is typically called halftone processing. An error diffusion method has been known as a related-art approach for performing high-quality halftone processing.

In the error diffusion method, when it is determined whether or not a dot is formed at one pixel to be processed (hereinafter also referred to as pixel of interest), the difference between the gradation value to be reproduced by the pixel and the gradation value converted from the density produced by formation of a dot (or formation of no dot) is determined as a gradation error and distributed as the diffusion error to the pixels around the pixel of interest that have not been processed yet. After the error is diffused to the pixels around a pixel to be processed, and the evaluation of whether or not a dot is formed and the diffusion of the error are similarly continued for the pixel to which the error has been diffused, the gradation values of the entire image become the gradation values of the original image, and the distribution of the formed dots also accords with the gradation of the original image.

Since the halftone processing using the error diffusion method typically takes time, the following scalable processing apparatus has been proposed: An image to undergo the halftone processing is divided into images; the divided images are processed in parallel so that the processing period is shortened; and halftone processing apparatuses are prepared in accordance with the number of divided images. For example, in JP-A-2020-65100, each halftone processor exchanges errors with an adjacent halftone processor, the errors each corresponding to a few pixels in the vicinity of the processing start edge and the processing end edge of the images to be processed to perform error diffusion also between the divided images for image-quality-securable parallel processing. JP-A-2020-31313 proposes a combination of the halftone processing using the error diffusion method and halftone processing using a systematic dithering method to provide an approach that is unlikely to cause a decrease in image quality even when the errors are not sufficiently diffused in the vicinity of the boundary between divided images.

The image processing methods described in JP-A-2020-65100 and JP-A-2020-31313 are excellent methods capable of dividing one image into images and processing the divided images in parallel. In view of the related art described above, the present inventor has developed a novel approach that allows reduction in the amount of data exchanged between the halftone processors operating in parallel and suppression of deterioration of the image quality at the boundaries between the divided images.

SUMMARY

The present disclosure can be achieved as the following aspects or application examples. As a first aspect of the present disclosure, there is provided an image processing apparatus that sequentially performs halftone processing on a two-dimensional original image extending in horizontal and vertical directions and formed of a plurality of pixels with one of the vertical and horizontal directions being a primary scan direction. The image processing apparatus includes a divider that divides the original image into n divided images (n is integer greater than or equal to 2) arranged in the primary scan direction, the divided images each having an upstream overlapping segment that overlaps with the divided image on an upstream in the primary scan direction by xa pixels (xa is integer greater than or equal to 1) arranged from a division position in each raster line along which pixels are arranged in the primary scan direction, n halftone processors that are provided in correspondence with the divided images, sequentially pick up as a pixel of interest each of the pixels that belong to each of the raster lines of the divided images, and apply an error diffusion method to the pixel of interest to perform the halftone processing, and an output section that combines results of the processing performed by the halftone processors on the divided images with one another and outputs processed data having gradation values smaller than gradation values of the original image, and the halftone processor that processes the divided image on a downstream in the primary scan direction out of the n divided images starts, after the halftone processor that processes the upstream divided image adjacent to the downstream divided image performs the halftone processing on a pixel of the upstream divided image on a j-th raster line (j is integer greater than or equal to 1) in a secondary direction, the halftone processing on a pixel on the j-th raster line of the divided image to be processed and carries out, in the halftone processing performed on the pixel that falls within the upstream overlapping segment on the j-th raster line of the divided image to be processed, a match process of matching by a degree specified in advance a result of the halftone processing performed on the pixel with a result of halftone processing performed on a corresponding pixel out of the xa pixels on the j-th raster line of the adjacent upstream divided image.

As a second aspect of the present disclosure, there is provided an image processing method for sequentially performing halftone processing on a two-dimensional original image extending in horizontal and vertical directions and formed of a plurality of pixels with one of the vertical and horizontal directions being a primary scan direction. The image processing method includes dividing the original image into n divided images (n is integer greater than or equal to 2) arranged in the primary scan direction, the divided images each having an upstream overlapping segment that overlaps with the divided image on an upstream in the primary scan direction by xa pixels (xa is integer greater than or equal to 1) arranged from a division position in each raster line along which pixels are arranged in the primary scan direction, performing halftone processing to which an error diffusion method is applied on each of the divided images in parallel, starting, in the halftone processing performed on the divided image on a downstream in the primary scan direction, after the halftone processing performed on a pixel of the upstream divided image adjacent to the downstream divided image on a j-th raster line (j is integer greater than or equal to 1) in a secondary direction, processing to which the error diffusion method is applied on a pixel on the j-th raster line of the divided image to be processed, carrying out, in the halftone processing performed on the pixel that falls within the upstream overlapping segment on the j-th raster line of the divided image to be processed, a match process of matching by a degree specified in advance a result of the halftone processing performed on the pixel with a result of the halftone processing performed on a corresponding pixel out of the xa pixels on the j-th raster line of the upstream divided image adjacent to the downstream divided image, and combining results of the halftone processing performed on the divided images with one another and outputting processed data having gradation values smaller than gradation values of the original image.

DESCRIPTION OF EXEMPLARY EMBODIMENTS

Figure 1:
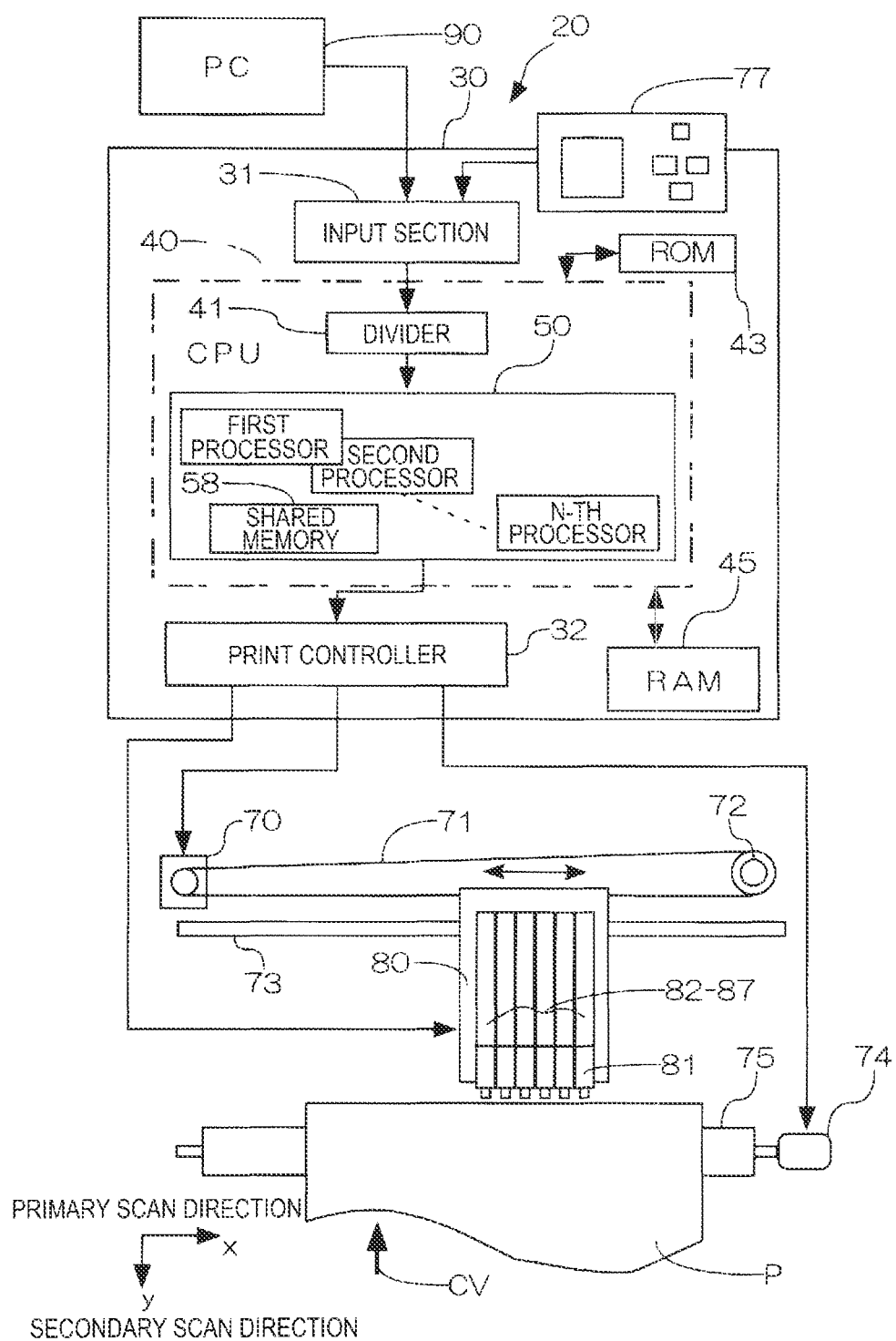
FIG. 1 is a schematic configuration diagram showing an image processing apparatus according to an embodiment.

A. First Embodiment (1) Hardware Configuration:

FIG. 1 is a schematic configuration diagram of a printer 20 including an image processing apparatus as the first embodiment. The printer 20 in the present embodiment is an inkjet printer. The printer 20 includes a mechanism that transports a print medium P with the aid of a paper feeding motor 74, a mechanism that reciprocates a carriage 80 in the axial direction of a platen 75 with the aid of a carriage motor 70, a mechanism that drives a print head 81 mounted on the carriage 80 to eject ink and form dots, and a control unit 30, which is responsible for exchange of signals with the paper feeding motor 74, the carriage motor 70, the print head 81, a computer 90, and an operation panel 77, as shown in FIG. 1.

The mechanism that reciprocates the carriage 80 in the axial direction of the platen 75 is formed of a sliding shaft 73, which is installed in parallel to the axis of the platen 75 and slidably holds the carriage 80, a pulley 72, which along with the carriage motor 70 stretches an endless drive belt 71, and other components. The movement direction of the carriage 80 with respect to the print medium P is called a primary scan direction x, and the transport direction of the print medium P transported by the paper feeding motor 74 is called a secondary scan direction y. It is noted that the directions described above should be taken as relative directions.

Color ink cartridges 82 to 87 containing respective color inks, a cyan ink C, a magenta ink M, a yellow ink Y, a black ink K, a light cyan ink Lc, and a light magenta ink Lm, respectively, are loaded into the carriage 80. The print head at the bottom of the carriage 80 has nozzle rows corresponding to the color inks described above. The ink cartridges 82 to 87 are loaded from above into the carriage 80, and the inks can be supplied from the cartridges to the print head 81.

The control unit 30 includes, for example, an input section 31, which is coupled to the computer 90 and the operation panel 77, a CPU 40, which is responsible for control of the entire printer 20, a ROM 43, which stores a program and other pieces of information, a RAM 45, which stores a variety of data and other pieces of information, and a print controller 32, which drives the variety of motors for printing and the print head 81, and the components described above are coupled to each other via a bus. The CPU 40 controls the overall operation of the printer 20 by developing in the RAM 45 the program stored in the ROM 43 and executing the program. The CPU 40 also functions as a divider 41 and an image processor 50 by executing a control program. The input section 31 provides the function of reading image data from the computer 90, the function of reading operation from the operation panel 77, and other functions. The print controller 32 controls the print head 81, the variety of motors, and other components described above to provide the function of performing printing on the print medium P.

The image processor 50 includes a plurality of processors (first processor to n-th processors are hereinafter also referred to as Xu(1) to Xu(n) units) that perform the halftone processing according to the error diffusion method. The n Xu(1) to Xu(n) units are separately prepared as hardware units that perform the halftone processing according to the error diffusion method. The CPU 40 may be a multi-core type CPU and may be achieved by assigning halftoning processes carried out in parallel to the respective cores. The Xu(1) to Xu(n) units can directly exchange data with each other via a shared memory 58. The shared memory 58 may, for example, be an L2 cache in the case of a multi-core CPU. The operation of the Xu(1) to Xu(n) units will be described later in detail with the aid of flowcharts.

The ROM 43 stores an error diffusion mask and other pieces of information as well as the control program. The error diffusion mask is a collection of weighting coefficients used to diffuse an error produced in a pixel of interest differently to the pixels around the pixel of interest in the halftone processing according to the error diffusion method described later. An actual example of the error diffusion mask will be specifically described later.

The RAM 45 is used to develop the control program described above and also used to temporarily store data necessary for computation performed by the CPU 40. The data include the following data.

[1] image data Dn resulting from division of an original image to undergo halftone processing

[2] dot data for printing resulting from the halftone processing

[3] diffusion error data that stores an error diffused to each pixel around a pixel of interest Among the aforementioned types of data, [3] is required for each of the Xu(1) to Xu(n) units, so that the RAM 45 is provided with storage areas corresponding to a first error buffer to an n-th error buffer. The storage areas corresponding to the first error buffer to the n-th error buffer may instead be provided in the shared memory 58.

The printer 20 having the hardware configuration described above reciprocates the print head 81 with respect to the print medium P in the primary scan direction by driving the carriage motor 70 and moves the print medium P in the secondary scan direction by driving the paper feeding motor 74. The control unit 30 forms ink dots having appropriate colors in appropriate positions on the medium P by driving the nozzles at appropriate timings based on print data in accordance with the reciprocating movement (primary scan) of the carriage 80 and the paper feeding movement (secondary scan) of the print medium. The printer 20 can thus print a color image inputted from the computer 90 on the print medium P. The printer 20 in the present embodiment employs what is called a serial printer configuration in which the print head 81 reciprocates in the width direction of the print medium P, that is, in the primary scan direction, but the scheme of the printer 20 is not limited to the scheme of a serial printer and can, of course, be the scheme of a line printer or a page printer.

Figure 2:
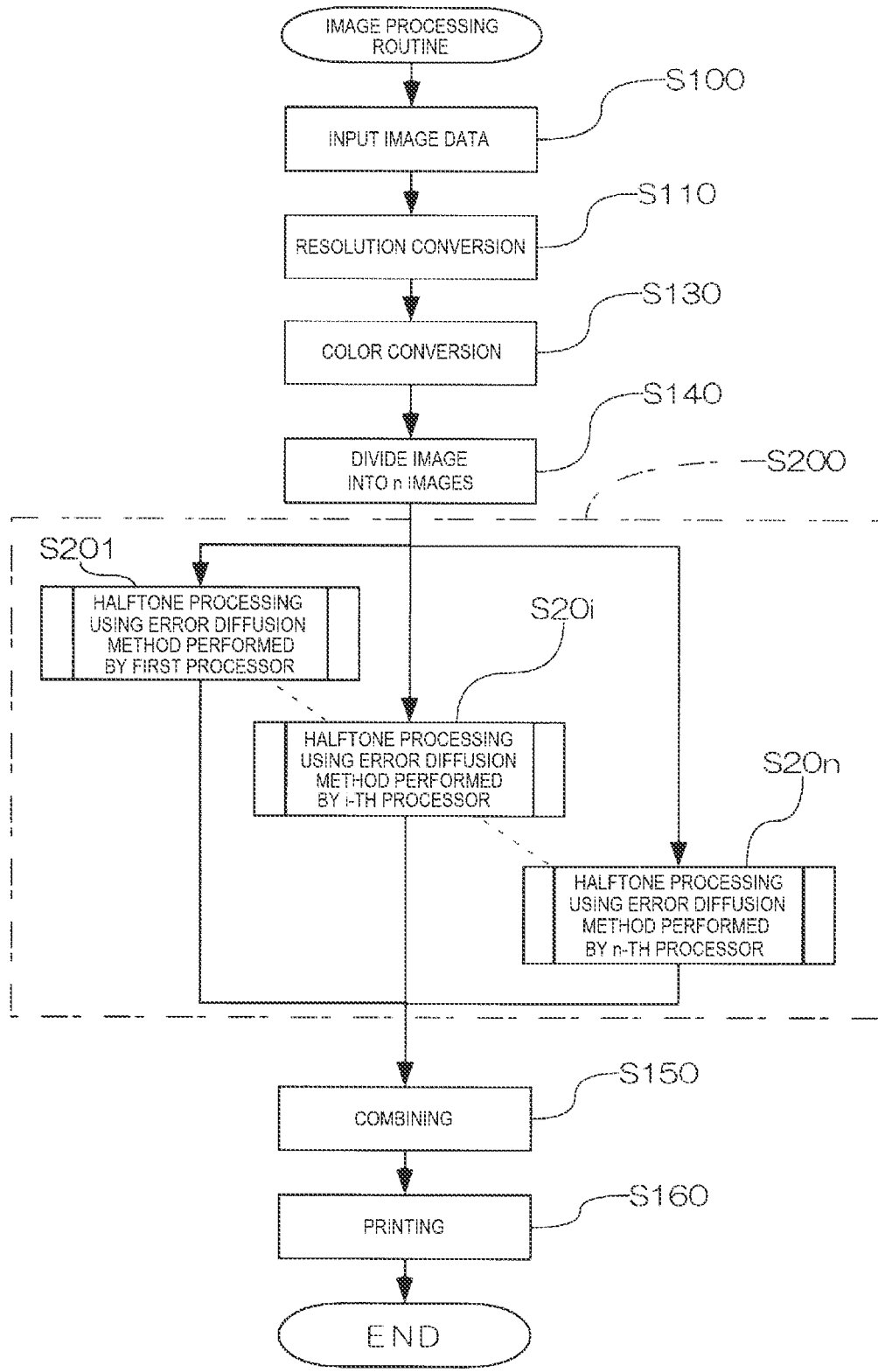
FIG. 2 is a flowchart showing an image processing routine of the embodiment.

(2) Image Processing:

An overview of the printing in the embodiment and image processing performed in the printing will be described. FIG. 2 is a flowchart showing the contents of the image processing including the printing performed by the printer 20. The image processing in the description starts when the computer 90 sends image data to be printed. When the printing starts, the CPU 40 carries out the process of inputting image data on an original image ORG from the computer 90 via the input section 31 (step S100). In the present example, the image data inputted from the computer 90 is data formed of three color components, red (R), green (G), and blue (B) components.

When the image data is inputted, the CPU 40 converts the resolution of the original image data into a resolution for printing as required (step S110) and further refers to a lookup table (not shown) stored in the ROM 43 to perform color conversion of the image data from the RGB format to the CMYKLcLm format (step S130). Since the color conversion is well known, the description thereof will be omitted.

Figure 3:
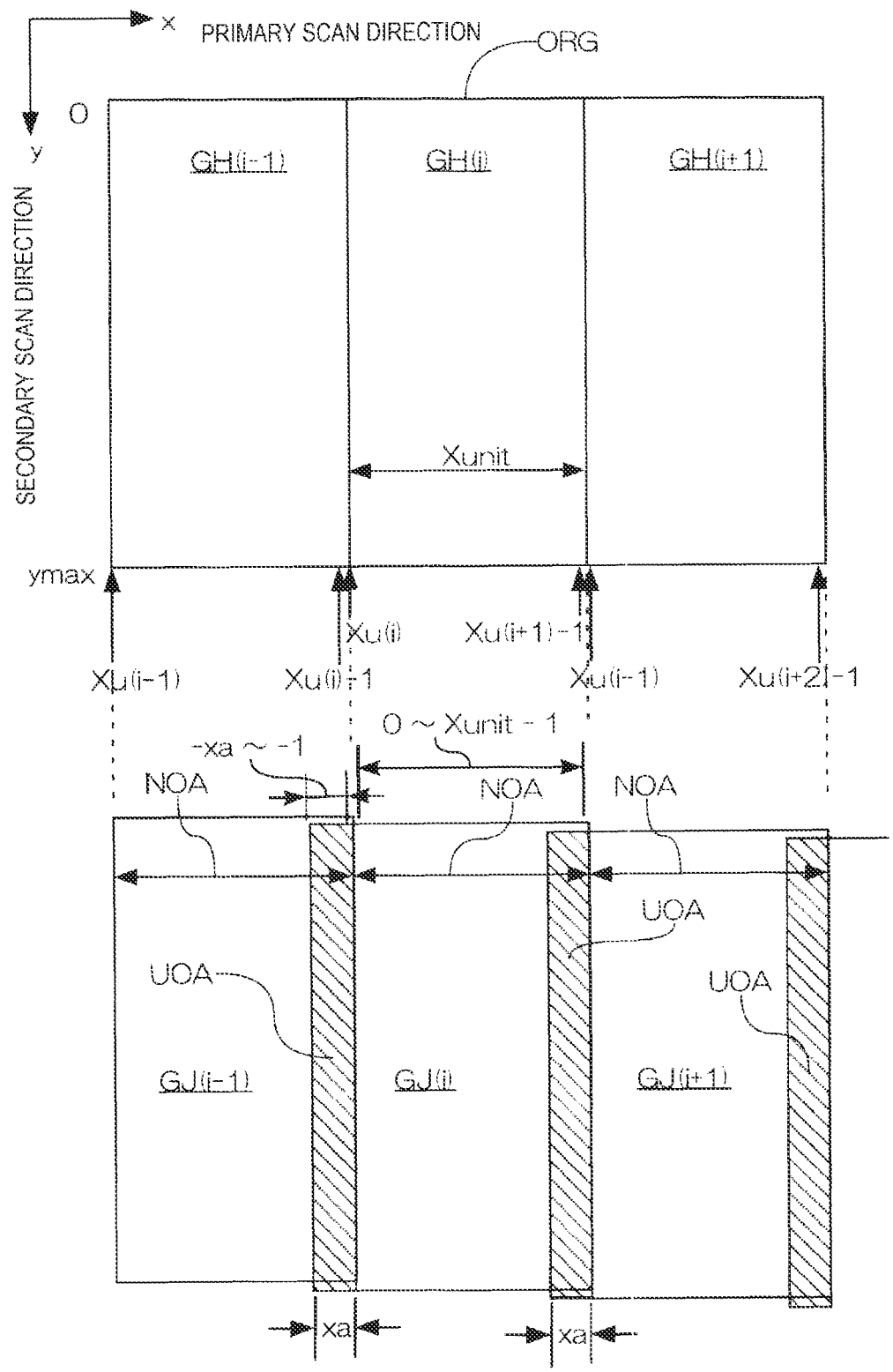
FIG. 3 is a descriptive diagram showing division of an original image in the first embodiment.

The CPU 40 then carries out the process of dividing the image (step S140). The image may be divided into any number of images as long as the number is two or more. The image is divided in accordance with the number of processors provided in the image processor 50 but is instead allowed to be divided into images the number of which is smaller than the number of processors. In FIG. 3, the upper row shows three divided images GH(i−1), GH(i), and GH(i+1) adjacent to each other resulting from division of the original image. The suffix i represents the numbers of the divided images and the processors in the primary scan direction. When the original image ORG is divided into n images, the suffix i is an integer ranging from 1 to n. The original image may be divided into n equal images, and the size of each divided image may vary as long as the divided image has pixels smaller than or equal to the number of pixels that the corresponding Xu(i) unit can process.

In the following description, a divided image and a processor may be expressed as an image i and an Xu(i) unit when it is not necessary to identify the number of the divided image and the number of the processor. Now, when Xu(i−1) and Xu(i) are picked up as two Xu units, Xu(i) corresponds to a "halftone processor that processes a divided image on the downstream in the primary scan direction out of the n divided images", and Xu(i−1) corresponds to a "halftone processor that processes the divided image adjacent to the divided image on the upstream thereof". Similarly, when Xu(i) and Xu(i+1) are picked up as two Xu units, Xu(i+1) corresponds to a "halftone processor that processes a divided image on the downstream in the primary scan direction out of the n divided images", and Xu(i) corresponds to a "halftone processor that processes the divided image adjacent to the divided image on the upstream thereof".

Let Xunit be the number of primary-scan-direction pixels of one of the n equally divided images resulting from simple equal division of the original image ORG. In the present embodiment, the divided images i are each provided with an overlapping portion in the primary scan direction to form a plurality of divided images. The lower portion of FIG. 3 shows the thus formed plurality of divided images. It is noted in the lower portion of FIG. 3 that each divided image is shifted in the secondary scan direction for ease of understanding. It is assumed that the overlapping portion is added to a side of each of the n equally divided images that is the side on the upstream of the primary scan direction. It is further assumed that the overlapping portion is formed of xa pixels, and the overlapping portion is hereinafter referred to as an upstream overlapping segment UOA. Three divided images GJ(i−1), GJ(i), and GJ(i+1) adjacent to each other overlap with each other in the upstream overlapping segment UOA, as shown in the lower portion of FIG. 3. In the thus configured divided image i, the Xu(i) unit is responsible for processing of Xunit pixels and xa pixels in the upstream overlapping segment UOA in the primary scan direction. That is, the Xu(i) unit is responsible for processing of the pixels from Xunit·(i−1)−xa to Xunit·i−1. Assuming that Xunit=100 and xa=16, the Xu(1) unit is responsible for 116 pixels from the pixel (−16, y) to the pixel (99, y), the Xu(2) unit is responsible for 116 pixels from the pixel (84, y) to the pixel (199, y), and the Xu(3) unit is responsible for 116 pixels from the pixel (184, y) to the pixel (299, y), and the Xu(1) to Xu(3) units perform the image processing on the respective pixels. The divided image GJ(1) has no portion corresponding to the upstream overlapping segment UOA, but it is assumed that image data formed of an array of dummy pixels each having a value of 0 may be prepared as the upstream overlapping segment UOA, and that the divided image GJ(1) may be handled in the same manner as the other divided images. Each divided image GJ(i) is not divided in the secondary scan direction (direction y) and has pixels arranged along each of raster lines formed of a raster line 0 to a raster line ymax in the secondary scan direction. The number of pixels xa, which determines the upstream overlapping segment UOA, is not limited to the value of 16 and may instead be a value of 1 or greater. A preferable range of the number of pixels xa may be specified as appropriate in accordance with the size of the original image, the width of the error diffusion range, and other factors. For example, the preferable range ranges from about 4 to 64 pixels, preferably, from about 16 to 48 pixels.

The original image ORG is divided as described above into divided images, which are temporarily stored as the image data GJ(i) on the divided images in the RAM 45, and the processors perform the halftone processing (step S200) in parallel on the divided images. The i-th processor (Xu(i) unit) performs the halftone processing (step S20$i$) based on the error diffusion method on the divided image i. The halftone processing based on the error diffusion method performed by each processor will be described later. In the present embodiment, the halftone processing provides dot data representing whether or not a dot is formed on a pixel basis. After the halftone processing is completed, the dot data, which are the results of the processing performed by the processors, are combined with one another (step S150), and the processed data corresponding to the original image ORG is outputted to the print controller 32, which performs the printing, which is the process of outputting the image onto the print medium P (step S160). The image processing routine is thus completed.

Figure 4:
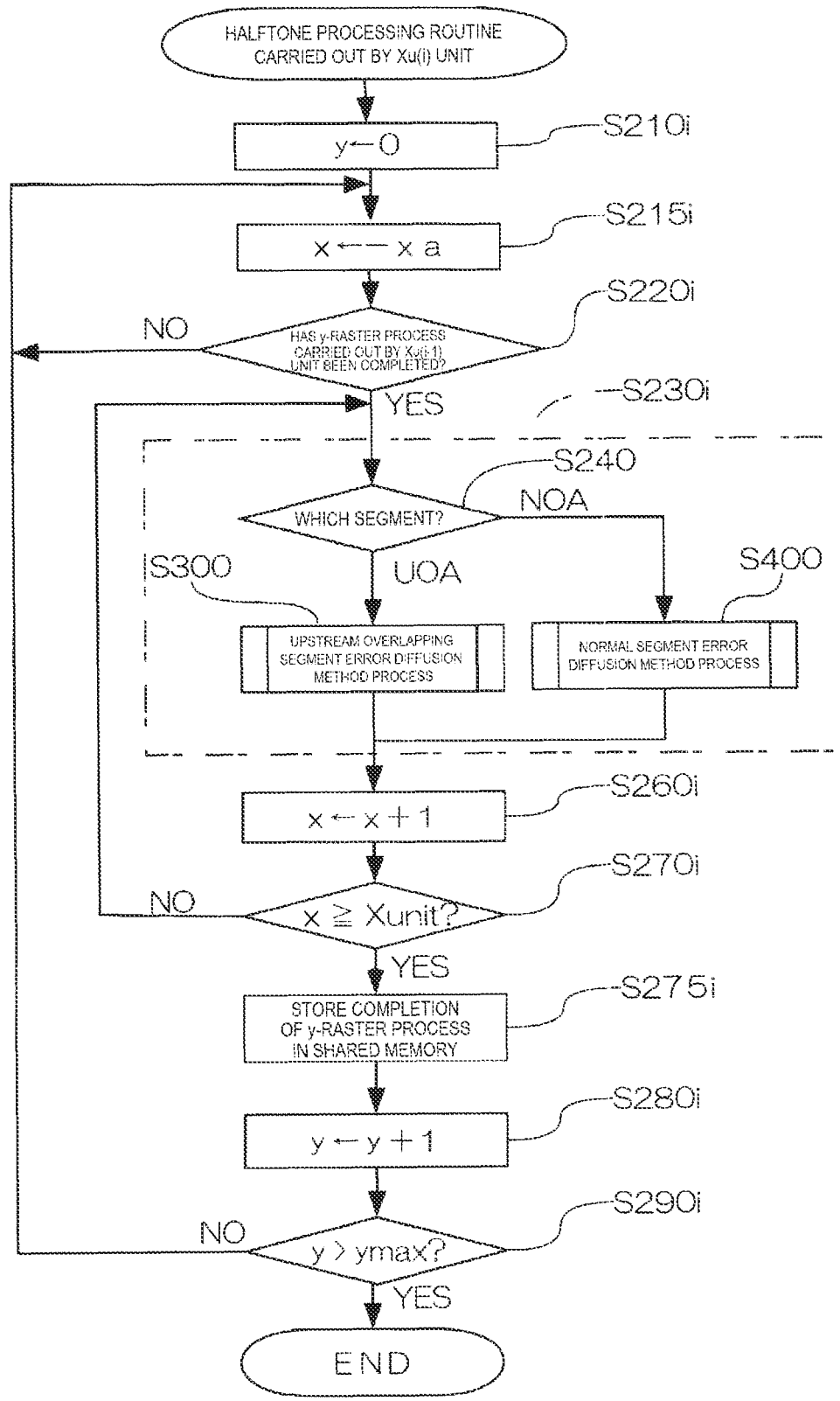
FIG. 4 is a flowchart showing a halftone processing routine carried out by an i-th unit in the first embodiment.

The halftone processing performed by the processors will next be described with reference to FIGS. 4 to 7. FIG. 4 shows an overview of the halftone processing performed by the Xu(i) unit. The processes in FIG. 4 correspond to the halftone processing performed by the units in step S200 in FIG. 2. When the Xu(i) unit starts processing the divided image GJ(i) stored in the RAM 45, the Xu(i) unit first initializes the coordinates (x, y) of a pixel to undergo the halftone processing (pixel of interest) by setting the coordinate y in the secondary scan direction at a value of 0 (step S210$i$) and setting the coordinate x in the primary scan direction at a value −xa (step S215$i$). The coordinate x is not the coordinate representing an absolute position in the primary scan direction in the original image ORG but is what is called a relative coordinate in a divided image on the assumption that xunit·(i−1) corresponds to x=0. The Xu units, which process the divided images GJ(1), GJ(2), . . . GJ(i), . . . GJ(n), can thus perform the same processing on all the divided images. The suffix i is therefore attached also to each step in FIG. 4. The coordinate x is initialized to −xa instead of 0 because the upstream overlapping segment formed of xa pixels is present.

Subsequently to the initialization, it is evaluated whether or not a y-raster process carried out by the Xu(i−1) unit has been completed (step S220$i$). The reason for this is that the y-raster process uses the result of the processing performed by the upstream Xu(i−1) unit adjacent to the Xu(i) unit, as will be described later. When the upstream Xu(i−1) unit adjacent to the Xu(i) unit completes the y-raster process, the Xu(i−1) unit writes the fact that the y-raster process has been completed to the shared memory 58. The Xu(i) unit can therefore grasp whether the upstream Xu(i−1) unit adjacent to the Xu(i) unit has completed the y-raster process by referring to the data in the shared memory 58. The Xu(i−1) unit waits until the Xu(i−1) unit completes the y-raster process, and when the Xu(i) unit can determine that the process has been completed, the Xu(i) unit next carries out a segment process (step S230$i$).

The segment process (step S230$i$) is the combination of the halftone processing in the upstream overlapping segment UOA, via which the divided image GJ(i) is adjacent to the upstream divided image GJ(i−1), and the halftone processing in the segment in which the divided image GJ(i) is not adjacent to the upstream divided image GJ(i−1) (hereinafter referred to as normal segment NOA). In the first embodiment, the process is performed independently on a segment basis, as will be described below, and the processing can be performed with part thereof being common processing. The two types of processing are collectively called the segment process.

In the present embodiment, when the segment process (step S230$i$) starts, the segment to which the pixel currently being processed (pixel of interest) belongs is determined based on the coordinate x (step S240). When the coordinate x falls within the range from −xa to −1, it can be determined that the pixel of interest falls within the upstream overlapping segment UOA. Therefore, in this case, an upstream overlapping segment error diffusion method process (step S300) is carried out. On the other hand, when the coordinate x falls within the range from 0 to Xunit−1, it can be determined that the pixel of interest falls within the normal segment NOA. Therefore, in this case, a normal segment error diffusion method process (step S400) is carried out. The upstream overlapping segment error diffusion method process (step S300) and the normal segment error diffusion method process (step S400) will be described in detail after the overall process is described.

After the segment process (step S230$i$) is carried out, the coordinate x in the primary scan direction is incremented by one to advance the coordinates of interest by one on the y raster line toward the downstream in the primary scan direction (step S260$i$). It is then evaluated whether the coordinate x of the pixel of interest is greater than or equal to Xunit (step S270$i$). When the coordinate x of the pixel of interest is not greater than or equal to Xunit, the control returns to the process in step S230$i$ described above, and the segment process for the updated pixel of interest is repeated. When the coordinate x of the pixel of interest is greater than or equal to Xunit, it is determined that the y-raster process has been completed ("YES" in step S270$i$), and the Xu(i) unit writes the fact that the y-raster process has been completed to the shared memory 58 (step S275$i$).

Thereafter, the coordinate y in the secondary scan direction is incremented by one to advance the coordinate y of the pixel of interest by one in the secondary scan direction (step S280$i$). It is then evaluated whether the coordinate y of the pixel of interest is greater than ymax (step S290$i$). When the coordinate y of the pixel of interest is not greater than ymax, the control returns to step S215$i$ described above, and the initialization of the coordinate x of the pixel of interest (step S215$i$) and the following processes described above (steps S215$i$ to S290$i$) are repeated. When the coordinate y of the pixel of interest is greater than ymax, it is determined that the 0-raster process to the y-raster process have all been completed ("YES" in step S290$i$), the control exits to "END" and terminates the halftone processing routine.

Figure 5:
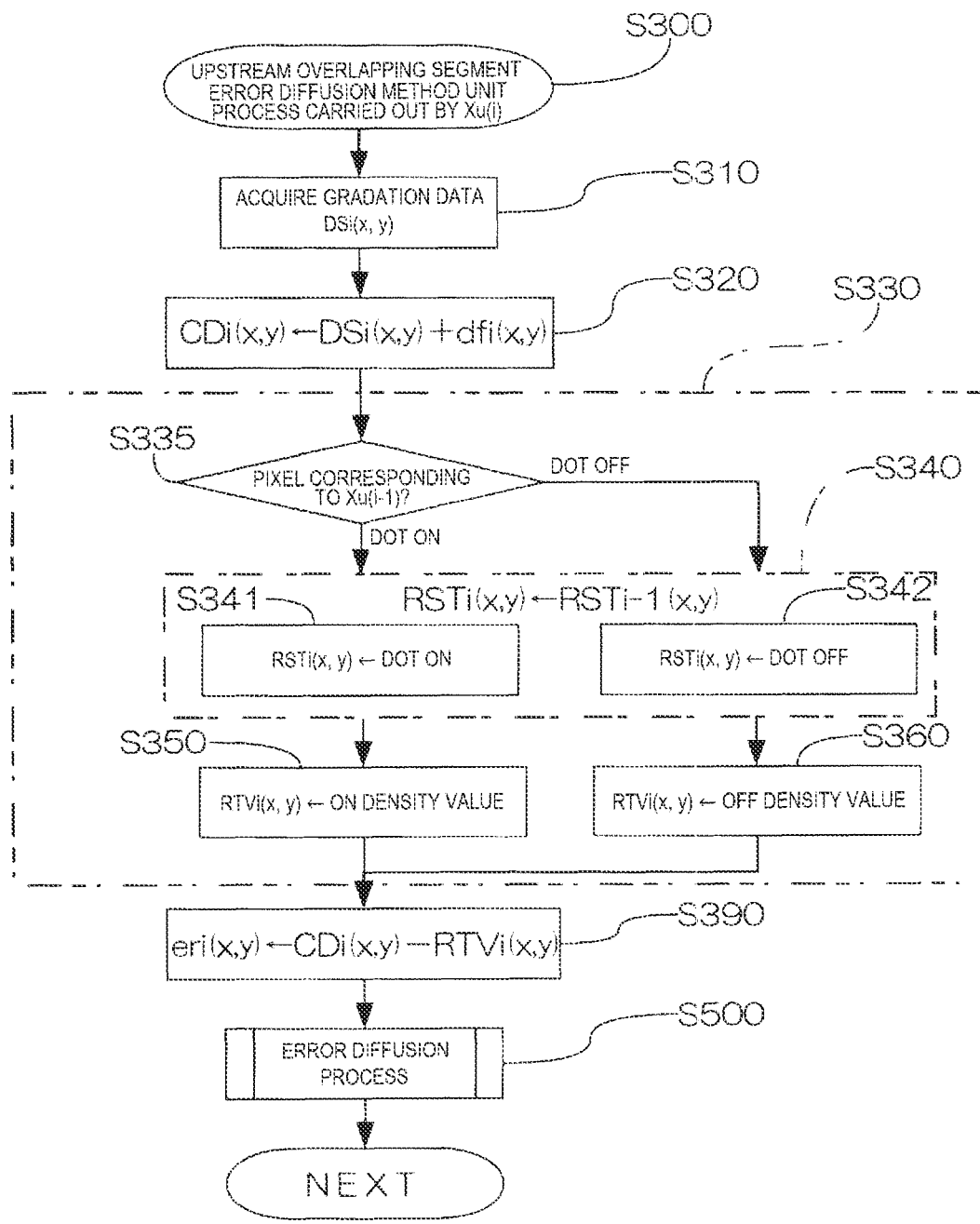
FIG. 5 is a flowchart showing an upstream overlapping segment error diffusion method process routine carried out by the i-th unit.

The upstream overlapping segment error diffusion method process (step S300) carried out by the Xu(i) unit will next be described with reference to FIG. 5. As having been already described above, when it is determined in the segment process (step S230$i$) that the coordinate x of the pixel of interest falls within the upstream overlapping segment UOA (step S240), the Xu(i) unit carries out the upstream overlapping segment error diffusion method process (step S300). In the following description, the pixel of interest accompanied by the coordinates thereof is expressed as a pixel of interest OP(x, y). When the process starts, gradation data DSi(x, y) on the gradation of the pixel of interest OP(x, y) is first acquired (step S310). Since the data on each divided image GJ(i) has been stored in the RAM 45, the gradation data DSi(x, y) on the gradation of the pixel of interest OP(x, y) can be sequentially acquired by reading the data.

Cumulative errors dfi(x, y) corresponding to the pixel of interest OP(x, y) are then read from the error buffers, and the read cumulative errors dfi(x, y) are added to the gradation data DSi(x, y) in accordance with Expression (1) below to determine corrected gradation value data CDi(x, y) (step S320).

$$CDi(x,y)=DSi(x,y)+dfi(x,y) \qquad (1)$$

The error buffers are each provided in a predetermined area of the RAM 45 and each accumulates and stores the result of the diffusion of a gradation error corresponding to a density error produced in a pixel having already undergone the halftone processing to the pixels around the pixel to be processed. After the corrected gradation value data CDi(x, y) is determined as described above, an exact match process (step S330) is carried out.

Figure 6A:
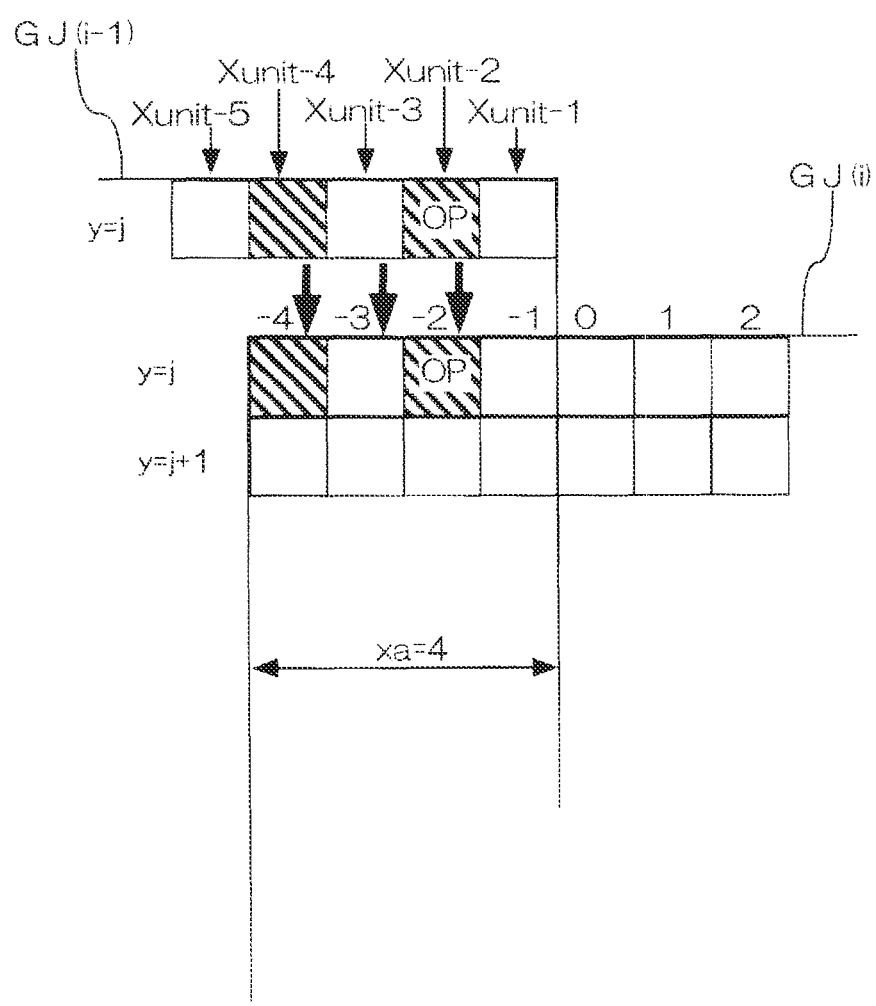
FIG. 6A is a descriptive diagram showing correspondence in an upstream overlapping segment.

The exact match process (step S330) is the process of matching the result of the processing based on the error diffusion method performed on the upstream overlapping segment UOA with the result of the processing performed on the corresponding segment of the upstream divided image GJ(i−1) adjacent to the divided image GJ(i). The processing described below can be performed because the y-raster process for the upstream divided image GJ(i−1) adjacent to the divided image GJ(i) has been completed in step S220*i* in FIG. 4. The process of matching the result of the processing based on the error diffusion method performed on the upstream overlapping segment UOA of the divided image GJ(i) being processed with the result of the processing performed on the corresponding segment of the upstream divided image GJ(i−1) adjacent to the divided image GJ(i) means that whether the pixel of interest OP(x, y) on the j-th raster line in the divided image GJ(i) being processed is turned on (dot is formed) or off (no dot is formed) is caused to accord with the result (on/off) of the processing performed on the pixel in the upstream divided image GJ(i−1) that corresponds to the pixel OP(x, y) of interest, as shown in FIG. 6A by way of example. In the example shown in FIG. 6A, xa=4 pixels for ease of understanding. According to the example shown in FIG. 6A, the pixels of interest (−4, j) and (−2, j) are turned on (dots are formed) in accordance with the result of the processing performed on the pixels (Xunit−4, j) and (Xunit−2, j) in the upstream divided image GJ(i−1), and the pixels of interest (−3, j) and (−1, j) are turned off (no dots are formed) in accordance with the result of the processing performed on the pixels (Xunit−3, j) and (Xunit−1, j) in the upstream divided image GJ(i−1).

Specifically, in the exact match process (step S330), the result of the halftone processing performed by the Xu(i−1) unit, which processes the divided image GJ(i−1) on the upstream of the pixel of interest O(x, y) is referred to (step S335). When the result of the processing performed on the pixel corresponding to the pixel of interest O(x, y) shows that a dot is formed (dot on), it is determined that a dot is formed also at the pixel of interest OP(x, y), and a result value RSTi(x, y), which is the result of the halftone processing performed on the pixel of interest OP(x, y), is set at a value of 1 representing dot-on (step S341). Further, an assessment value RTVi(x, y) is set at a dot-on density value that is expected to be achieved by dot formation (step S350). On the other hand, when the result of the processing performed on the pixel corresponding to the pixel of interest O(x, y) shows that no dot is formed (dot off), it is determined that no dot is formed also at the pixel of interest OP(x, y), and the result value RSTi(x, y), which is the result of the halftone processing performed on the pixel of interest OP(x, y), is set at a value of 0 representing dot-off (step S342). Further, the assessment value RTVi(x, y) is set at a dot-off density value that is expected to be achieved by no dot formation (step S360). The on-density value corresponds to a gradation value achieved by dot formation, and when the density is expressed by 8 bits, the density value is typically set at 255. The off-density value corresponds to a gradation value achieved by no dot formation, that is, a density value of 0 corresponding to paper white.

Steps S341 and S342 described above are substantially achieved as the process of substituting STi−1(x, y), which is the result of the processing performed on the pixel corresponding to the pixel of interest OP(x, y), into the result value RSTi(x, y) of the pixel of interest OP(x, y) (step S340). The exact match process (step S330) may therefore instead be formed of the following processes sequentially carried out: The single process of substituting STi−1(x, y), which is the result of the processing performed on the pixel corresponding to the pixel of interest O(x, y), into the result value RSTi(x, y) of the pixel of interest OP(x, y) may first be carried out (step S340); it is then evaluated whether the pixel of interest OP(x, y) shows dot-on or dot-off (step S335); and in accordance with the result of the evaluation, the assessment value RTVi(x, y) is set at the on-density value (step S350) or the off-density value (step S360). The procedure described above can simplify the processing, whereas the method in FIG. 5 makes it clear that the result of the processing performed on the upstream overlapping segment UOA is caused to match with the result of the processing performed on the upstream image GJ(i−1).

After the match process (step S330), the difference between the corrected gradation value data CDi(x, y) and the assessment value RTVi(x, y) for the pixel of interest is determined in the form of a gradation error eri(x, y) in accordance with Expression (2) below (step S390).

$$eri(x,y)=CDi(x,y)-RTVi(x,y) \qquad (2)$$

Figure 6B:
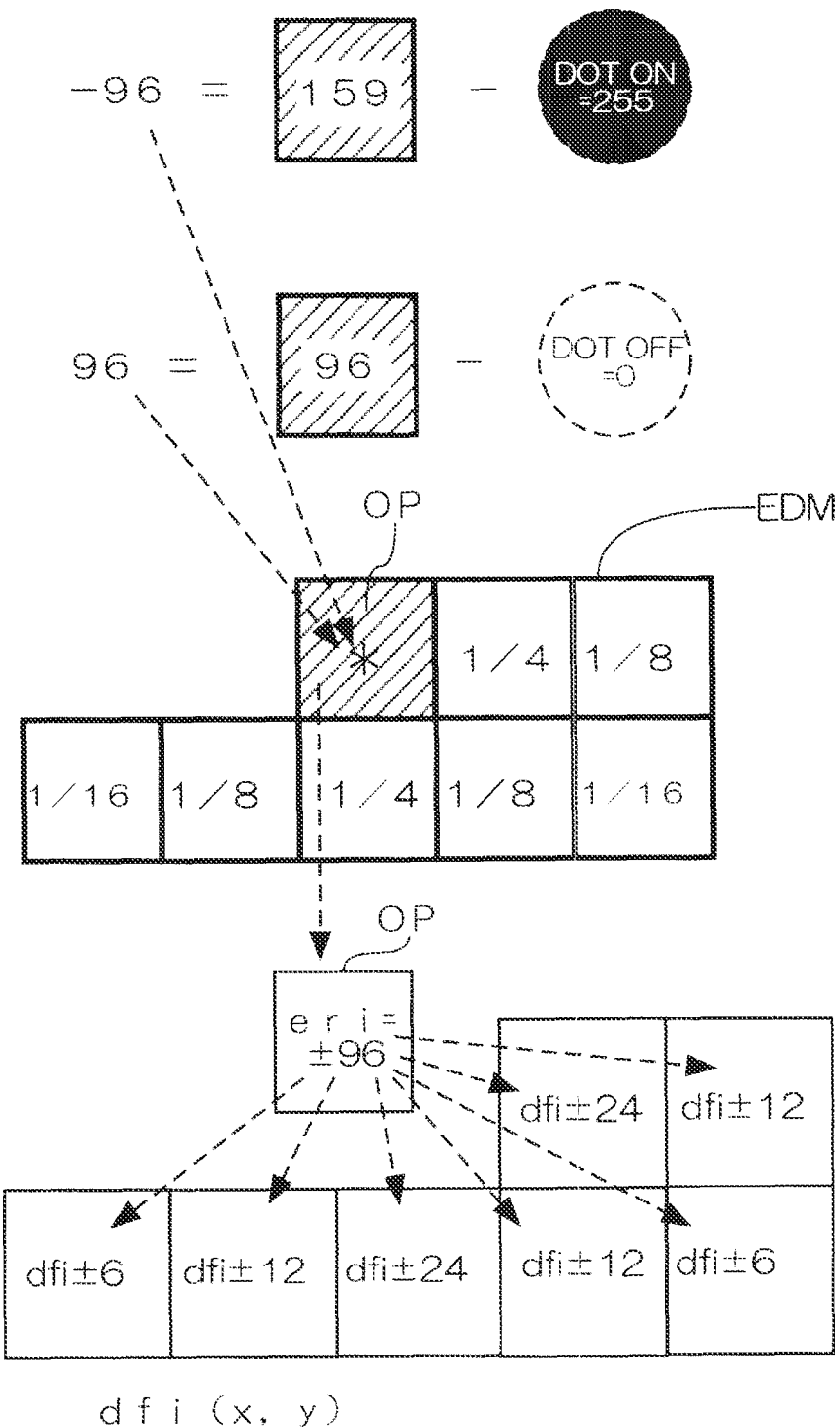
FIG. 6B is a descriptive diagram showing error diffusion in the upstream overlapping segment.

An error diffusion process (step S500) is then carried out. The error diffusion process (step S500) is the process of distributing the gradation error eri(x, y) determined in step S390 with respect to the pixel of interest OP(x, y) to a plurality of unprocessed pixels around the pixel of interest OP(x, y). FIG. 6B shows the error diffusion. The gradation error eri(x, y) produced in the pixel of interest OP(x, y) is the difference between the corrected gradation value data CDi (x, y) at the pixel of interest OP(x, y) and the gradation at the pixel achieved by an ink droplet formed on the print medium P in accordance with the dot on/off.

FIG. 6B shows two cases, a case where the corrected gradation value data CDi(x, y) on the gradation of the pixel of interest has a value of 159 and a case where the corrected gradation value data CDi(x, y) has a value of 96. In these cases, when the dot on/off is determined in accordance with the result of the processing performed on the pixel in the upstream overlapping segment that corresponds to the pixel of interest, and when it is determined that a dot is formed at the pixel having the corrected gradation value data CDi(x, y)=159, the assessment value RTVi(x, y) is set at the value of 255. The assessment value RTVi is set at the value of 255 because, when a dot is formed at the pixel, it is assumed that the gradation value in a position on the print medium P that is the position corresponding to the pixel is maximized (255). Similarly, when it is determined that no dot is formed at the pixel having the corrected gradation value data CDi(x, y)=96, the assessment value RTVi(x, y) is set at the value of 0. The assessment value RTVi is set at the value of 0 because, when no dots is formed at the pixel, it is assumed that the gradation value in a position on the print medium P that is the position corresponding to the pixel is minimized (0) in correspondence with the ground color of the print medium P, that is, typically white. The assessment value RTVi(x, y) is set as appropriate in accordance with the size of an actually formed dot, the density of the ink, and other factors.

The gradation error eri(x, y) is determined under the conditions described above as follows (step S390).

$$eri(x,y)=159-255=-96, \text{ when a dot is formed}$$

$$eri(x,y)=96-0=96, \text{ when no dot is formed}$$

The thus determined gradation error eri(x, y) is diffused to the pixels around the pixel of interest (step S500). The diffusion to the surrounding pixels is performed in accordance with the weighting coefficients stored in the error diffusion mask EDM shown in FIG. 6B. In the example shown in FIG. 6B, the weighting coefficients are defined at seven pixels around a pixel of interest *. The weighting coefficient at the pixel (x+1, y) and the pixel (x, y+1) with respect to the pixel of interest OP(x, y) is ¼, the weighting coefficient at the pixel (x+2, y), the pixel (x+1, y+1), and the pixel (x−1, y+1) with respect to the pixel of interest OP(x, y) is ⅛, and the weighting coefficient at the pixel (x+2, y+1) and pixel (x−2, y+1) with respect to the pixel of interest OP(x, y) is 1/16. Therefore, when the gradation error eri is ±96, the error diffused to the pixels is ±24 when the weighting coefficient is ¼, ±12 when the weighting coefficient is ⅛, and ±6 when the weighting coefficient is 1/16, as shown in FIG. 6B. The values described above are added to and stored in the error buffers prepared in the RAM 45 as the error to be diffused to each pixel (x, y).

Specifically, the cumulative errors dfi stored in the error buffers prepared in the RAM 45 are updated in accordance with Expression (3) below. In the following description including Expression (3), eri(x, y) is simply abbreviated to eri in some cases.

$$dfi(x+1,y)=dfi(x+1,y)+eri/4$$

$$dfi(x+2,y)=dfi(x+2,y)+eri/8$$

$$dfi(x-2,y+1)=dfi(x-2,y+1)+eri/16$$

$$dfi(x-1,y+1)=dfi(x-1,y+1)+eri/8$$

$$dfi(x,y+1)=dfi(x,y+1)+eri/4$$

$$dfi(x+1,y+1)=dfi(x+1,y+1)+eri/8$$

$$dfi(x+2,y+1)=dfi(x+2,y+1)+eri/16 \quad (3)$$

After the diffusion of the gradation error eri produced at the pixel of interest OP(x, y) to the pixels around the pixel of interest OP(x, y) as described above, the control exits to "NEXT", and the upstream overlapping segment error diffusion method process routine is terminated.

As described above, in the present embodiment, whether or not a dot is formed at the pixel of interest OP(x, y) in the upstream overlapping segment (−xa to −1) of the divided image GJ(i) to be processed depends on the result of the halftone processing performed on the corresponding pixel in the upstream divided image GJ(i−1) adjacent to the divided image GJ(i) to be processed, and the gradation error eri(x, y) is computed (step S390) and the error diffusion is performed (step S500) in accordance with the result of the halftone processing. However, since whether or not a dot is formed in the upstream overlapping segment UOA is determined by the upstream Xu(i−1) unit, the computation performed by the Xu(i) unit is so restricted that the error computation and the error diffusion are performed while the on/off operation of the dot formation is caused to coincide with the result of the processing performed by the upstream Xu(i−1) unit.

Figure 7:
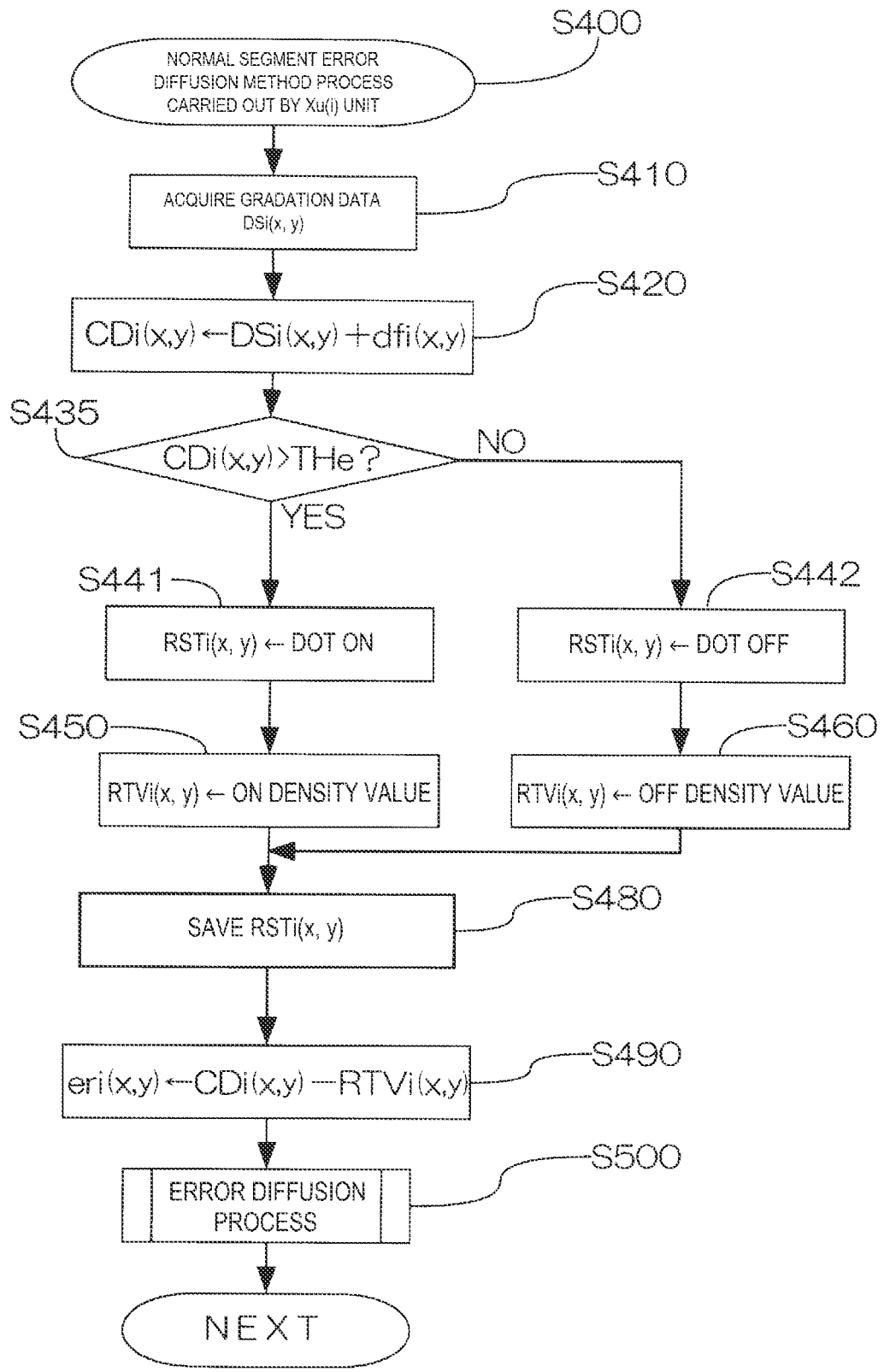
FIG. 7 is a flowchart showing a normal segment error diffusion method process routine carried out by the i-th unit.

The normal segment error diffusion method process (step S400 in FIG. 4) will be next described with reference to FIG. 7. Out of the steps of the normal segment error diffusion method process, those corresponding to the steps of the upstream overlapping segment error diffusion method process shown in FIG. 5 each have the same last two digits. The description of the corresponding steps is simplified. In the halftone processing routine (FIG. 4) carried out by the i-th processor, when the i-th processor determines that the normal segment NOA is the segment to which the pixel of interest OP(x, y) belongs (step S240), the i-th processor first acquires the gradation data DSi(x, y) on the gradation of the pixel of interest O (x, y) in the divided image GJ(i) being processed (step S410). Since the data on each divided image GJ(i) has been stored in the RAM 45, the gradation data DSi(x, y) on the gradation of the pixel of interest OP(x, y) can be sequentially acquired by reading the data stored in the RAM 45.

The i-th processor then reads the cumulative errors dfi(x, y) corresponding to the pixel of interest OP(x, y) from the error buffers and adds the read cumulative errors dfi(x, y) to the gradation data DSi(x, y) to determine the corrected gradation value data CDi(x, y) (step S420) in accordance with Expression (1) described above. After determining the corrected gradation value data CDi(x, y) as described above, the i-th processor evaluates whether or not the corrected gradation value data CDi(x, y) is greater than a threshold THe specified in advance (step S435). The threshold THe may be a fixed value or may be increased or decreased in accordance with the gradation data DSi(x, y).

When the corrected gradation value data CDi(x, y) is greater than the threshold THe, the i-th processor determines that a dot is formed at the pixel of interest OP(x, y), sets the result value RSTi(x, y), which is the result of the halftone processing performed on the pixel of interest OP(x, y), at the value of 1 representing dot-on (step S441), and further sets the assessment value RTVi(x, y) at the dot-on density value (for example, value of 255), which is expected to be achieved by the dot formation (step S450). On the other hand, when the corrected gradation value data CDi(x, y) is smaller than or equal to the threshold THe, the i-th processor determines that no dot is formed at the pixel of interest OP(x, y), sets the result value RSTi(x, y), which is the result of the halftone processing performed on the pixel of interest OP(x, y), at the value of 0 representing dot-off (step S442), and further sets the assessment value RTVi(x, y) at the dot-off density value (for example, value of 0), which is expected to be achieved by no dot formation (step S460).

Since the processes (steps S435 to S460) are followed by processing performed on the normal segment NOA, the i-th processor saves the result value RSTi(x, y), which is the result of the processing performed by the Xu(i) unit, in the RAM 45 (step S480). The result value RSTi(x, y) represents an image to be eventually printed, that is, the dot on/off on a pixel basis.

The i-th processor then determines the difference between the corrected gradation value data CDi(x, y) and the assessment value RTVi(x, y) at the pixel of interest as the gradation error eri(x, y) in accordance with Expression (2) described above (step S490) and carries out the error diffusion process (step S500) of diffusing the determined gradation error eri(x, y) to peripheral unprocessed pixels. The error diffusion process (step S500) is the same in terms of content as the error diffusion process (step S500) described with reference to the upstream overlapping segment error diffusion method process routine.

According to the first embodiment described above, when the divided images GJ(1) to GJ(n) resulting from the division of the original image ORG into n images are processed in parallel by the n processing units, the Xu(i) unit that performs the halftone processing on the downstream divided image can start the processing with delay corresponding to only one raster line with respect to the Xu(i−1) unit that performs the halftone processing on the upstream divided image. Therefore, when the original image is divided into n divided images, the halftone processing performed on the original image ORG can be completed with delay of the processing period corresponding to minimum n raster lines. That is, the advantage of the parallel processing can be received while employing the error diffusion method process. As a result, the halftone processors can each be readily achieved by hardware. Further, since the halftone processors can be configured in substantially the same manner, the number of halftone processors can be readily changed in accordance with the number of divided images, whereby what is called a scalable configuration is readily achieved.

Moreover, in the parallel processing, the upstream overlapping segment is provided, and the downstream Xu(i) unit employs the result of the processing based on the error diffusion method performed by the upstream Xu(i−1) unit to carry out the error diffusion process. Therefore, when the processing performed on the upstream overlapping segment is completed, the error buffers for the first pixel processed by the downstream Xu(i) unit take over the majority of an error to be diffused from the upstream divided image GJ(i). As a result, the result of the halftone processing performed by the upstream Xu(i−1) unit on the pixels (−xa to −1) in the upstream overlapping segment and the result of the halftone processing performed by the downstream Xu(i) unit on the portion adjacent to the upstream overlapping segment and being the beginning of the normal segment NOA are satisfactorily contiguous to each other. Specifically, occurrence of a pseudo-contour at the portion where an image is divided, occurrence of significant disturbance of the dot pattern, and occurrence of other phenomena can be suppressed. Since the processing based on the error diffusion method is performed in the first place within the range of the divided image GJ(i) resulting from the division of the original image ORG, that is, within the range from −xa to Xunit−1, an error due to a situation of the dot formation beyond the range described above is not fully taken into consideration, but the influence of an error produced by the dot formation is greatly lessened in positions remote from the position where the dot is formed. Therefore, when the upstream overlapping segment UOA is formed of a predetermined number of pixels, for example, about 8 to 32 pixels, occurrence of image quality deterioration due to the situation in which the divided images are individually processed is sufficiently suppressed. The size of the upstream overlapping segment may be changed in accordance with the size of the error diffusion mask EDM.

B. Second Embodiment

Figure 8:
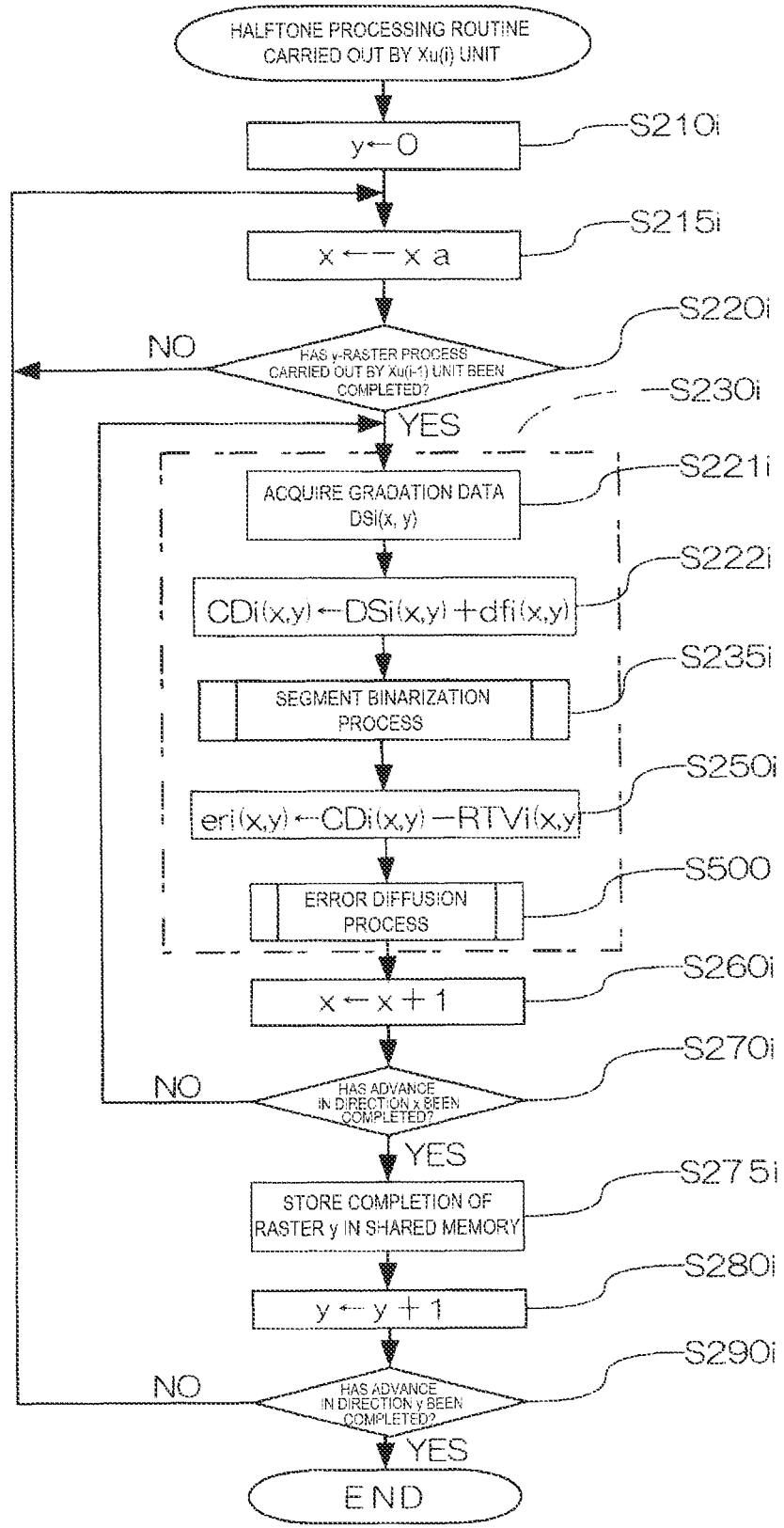
FIG. 8 is a flowchart showing the halftone processing routine carried out by the i-th unit in a second embodiment.

The printer 20 including the image processing apparatus according to a second embodiment will next be described. The printer 20 has the same hardware configuration as that in the first embodiment shown in FIG. 1 but differs therefrom in terms of the halftone processing to be performed. FIG. 8 shows an overview of the halftone processing performed by the Xu(i) unit in the second embodiment. In the second embodiment, the same processes as those in the halftone processing in the first embodiment described above (FIG. 4) have the same step numbers and will be described in a simplified manner. Also in the second embodiment, the Xu(i) unit processes the divided image GJ(i) stored in the RAM 45, and the division of the original image ORG and the range of the upstream overlapping segment in the second embodiment are the same as those in the first embodiment.

When the halftone processing routine shown in FIG. 8 starts, the Xu(i) unit sets the coordinate y in the secondary scan direction at the value of 0 (step S210i) and sets the coordinate x in the primary scan direction at the value −xa (step S215i). The coordinate x is not the coordinate representing an absolute position in the primary scan direction in the original image ORG but is what is called a relative coordinate in a divided image on the assumption that Xunit·(i−1) corresponds to x=0.

Subsequently to the initialization, it is evaluated whether or not the y-raster process carried out by the Xu(i−1) unit has been completed (step S220i). The reason for this is that the y-raster process uses the result of the processing performed by the upstream Xu(i−1) unit adjacent to the Xu(i) unit. The Xu(i−1) unit waits until the Xu(i−1) unit completes the y-raster process, and when the Xu(i) unit can determine that the process has been completed, the Xu(i) unit next carries out the segment process (step S230i).

The segment process (step S230i) is the combination of the halftone processing in the upstream overlapping segment UOA, via which the divided image GJ(i) is adjacent to the upstream divided image GJ(i−1), and the halftone processing in the segment in which the divided image GJ(i) is not adjacent to the upstream divided image GJ(i−1) (hereinafter referred to as normal segment NOA). In the second embodiment, the processing can be performed with part thereof being common processing, as will be described below.

Figure 9:
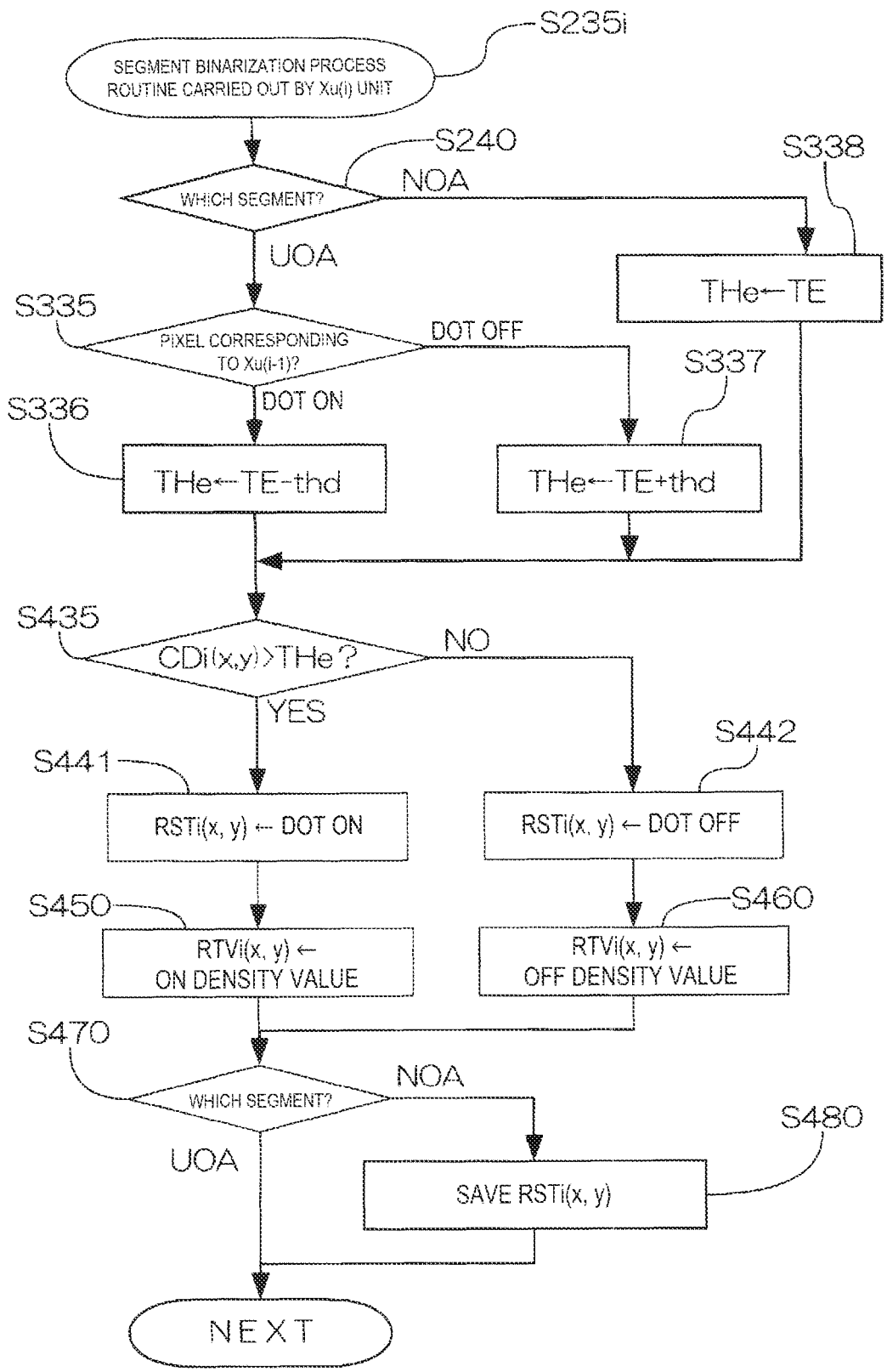
FIG. 9 is a flowchart showing a segment process routine carried out by the i-th unit in the second embodiment.

In the present embodiment, when the segment process (step S230i) starts, the Xu(i) unit first reads the cumulative error dfi(x, y) corresponding to the pixel of interest OP(x, y) from the corresponding error buffer and adds the read cumulative error dfi(x, y) to the gradation data DSi(x, y) in accordance with Expression (1) described above to determine the corrected gradation value data CDi(x, y) (step S222i). Having determined the corrected gradation value data CDi(x, y) as described above, the Xu(i) unit carries out a segment binarization process (step S235i). The segment binarization process (step S235i) is binarization performed on the upstream overlapping segment UOA and the normal segment NOA, and FIG. 9 shows the overview of the segment binarization process.

In the segment binarization process, the Xu(i) unit first determines the segment to which the pixel currently being processed (pixel of interest) belongs (step S240). When the coordinate x falls within the range from −xa to −1, the Xu(i) unit determine that the upstream overlapping segment UOA is the segment to which the pixel currently being processed belongs and refers to the result of the halftone processing performed by the Xu(i−1) unit, which processes the divided image GJ(i−1) on the upstream of the pixel of interest OP(x, y) (step S335). When the result of the processing performed on the pixel corresponding to the pixel of interest O(x, y) shows that a dot is formed (dot on), the threshold THe used for the binarization evaluation is set at a value resulting from subtraction of a predetermined value thd from a reference threshold TE specified in advance (step S336), whereas when the result of the processing performed on the pixel corresponding to the pixel of interest O(x, y) shows that no dot is formed (dot off), the threshold THe used for the binarization evaluation is set at a value resulting from addition of the predetermined value thd to the reference threshold TE specified in advance (step S337).

The process in step S336 or S337 increases the matching rate representing the degree of the match of the result of the binarization evaluation in the subsequent step S435, that is, the evaluation of whether or not the corrected gradation value data CDi(x, y) is greater than the threshold THe specified in advance with the state of the corresponding dot formed by the upstream Xu(i−1) unit determined in step S335. The matching rate is specified by the magnitude of the predetermined value thd, which increases or decreases the threshold THe. For example, when the reference threshold TE has a value of 127 and the predetermined value thd has a value of 32, $$THe=TE-thd=127-32=95, \text{ and}$$

$$THe=TE+thd=127+32=159,$$

so that the possibility of the matching between the two formed dots increases although no exact matching is achieved. Instead of increasing or a decreasing the threshold THe by the predetermined value thd from the reference threshold TE as described above, the threshold THe may be set at a value considerably lower than the reference value, that is, may be set at a value of 0 or a negative value in some cases when a dot is formed at the corresponding pixel, or the threshold THe may be set at a value specified in advance, such as a value considerably greater than the reference value, that is, a value greater than the value of 255 in some cases when no dot is formed at the corresponding pixel.

On the other hand, in determining the segment to which the pixel of interest OP(x, y) belongs (step S240), when the coordinate x does not fall within the range from −xa to −1, it is determined that the normal segment NOA is the segment to which the pixel of interest OP(x, y) belongs, and the threshold THe used for the binarization evaluation is set at the reference threshold TE specified in advance (step S338). That is, in the upstream overlapping segment, the threshold THe is increased or decreased by the predetermined thd from the reference threshold TE (step S336 or S337), whereas in the normal segment NOA, the threshold THe is set at the reference threshold TE (step S338), and the evaluation of the binarization of the pixel of interest OP(x, y) (step S435) is then performed.

In step S435, when the corrected gradation value data CDi(x, y) is greater than the threshold THe, the Xu(i) unit determines that a dot is formed at the pixel of interest OP(x, y), sets the result value RSTi(x, y), which is the result of the halftone processing performed on the pixel of interest OP(x, y), at the value of 1 representing dot-on (step S441), and further sets the assessment value RTVi(x, y) at the dot-on density value (for example, value of 255) expected to be achieved by the dot formation (step S450). On the other hand, when the corrected gradation value data CDi(x, y) is smaller than or equal to the threshold THe, the i-th processor determines that no dot is formed at the pixel of interest OP(x, y), sets the result value RSTi(x, y), which is the result of the halftone processing performed on the pixel of interest OP(x, y), at the value of 0 representing dot-off (step S442), and further sets the assessment value RTVi(x, y) at the dot-off density value (for example, value of 0), which is expected to be achieved by no dot formation (step S460). The processes described above are the same as the processes in steps S435 to S460 of the normal segment error diffusion method process (FIG. 7) described in the first embodiment.

After the processes described above (steps S435 to S460), the Xu(i) unit determines again whether the segment to which the pixel of interest OP(x, y) currently being processed belongs (step S470), and when the pixel of interest OP(x, y) falls within the upstream overlapping segment UOA, the Xu(i) unit performs no action, whereas when the pixel of interest OP(x, y) falls within the normal segment NOA, the result value RSTi(x, y), which is the result of the processing performed by the Xu(i) unit, is saved in the RAM 45 (step S480). The result value RSTi(x, y) represents an image to be eventually printed, that is, dot on/off on a pixel basis, and the upstream overlapping segment is determined by the X (i−1), which processes the upstream divided image GJ(i−1), so that the Xu(i) unit only performs the error calculation and the error diffusion in the upstream overlapping segment and is not involved in the final dot on/off.

After the segment binarization process described above, the error diffusion process (step S500) having been already described is carried out. The error diffusion process (step S500) is the same as that in the first embodiment. The segment process (step S230i) is thus completed, and the coordinate x in the primary scan direction is then incremented by one to advance the coordinates of interest by one on the y raster line toward the downstream in the primary scan direction (step S260i). Thereafter, it is determined that the processes described above (steps S230i to S260i) are repeated until the coordinate x of the pixel of interest becomes greater than or equal to Xunit (step S270i), and after the coordinate x of the pixel of interest becomes greater than or equal to Xunit, the fact that the Xu(i) unit has completed the y-raster process to the y raster line is written to the shared memory 58 (step S275i).

Thereafter, the coordinate y in the secondary scan direction is incremented by one to advance the coordinate y of the coordinate of interest in the secondary scan direction (step S280i), and it is determined that the processes described above (steps S215i to S280i) are repeated until the coordinate y of the pixel of interest becomes greater than ymax (step S290i). When the coordinate y of the pixel of interest is greater than ymax, it is determined that the y-raster process has been completed from 0 toy raster lines ("YES" in step S290i), and the control exits to "END" to terminate the half tone processing routine in the second embodiment.

According to the second embodiment described above, in the upstream overlapping segment UOA, the Xu(i) unit, which performs the halftone processing, increases or decreases the binarization threshold THe in accordance with the result of the processing performed by the upstream Xu(i−1) unit, whereby the result of the halftone processing performed on the pixel of interest OP(x, y) approaches the result of the processing performed by the upstream Xu(i−1) unit. As described above, even when the result of the processing performed by the Xu(i) unit that performs the halftone processing does not exactly match with the result of the processing performed by the upstream Xu(i−1) unit in the upstream overlapping segment UOA, the error buffers for the first pixel processed by the downstream Xu(i) unit take over a considerable portion of the error to be diffused from the upstream divided image GJ(i) when the processing performed in the overlapping segment is completed. As a result, the same effects as those provided by the first embodiment can be provided, for example, the result of the halftone processing performed by the upstream Xu(i−1) unit on the pixels (−xa to −1) in the upstream overlapping segment and the result of the halftone processing performed by the downstream X (i) unit on the portion adjacent to the upstream overlapping segment and being the beginning of the normal segment NOA are satisfactorily contiguous to each other.

Figure 10:
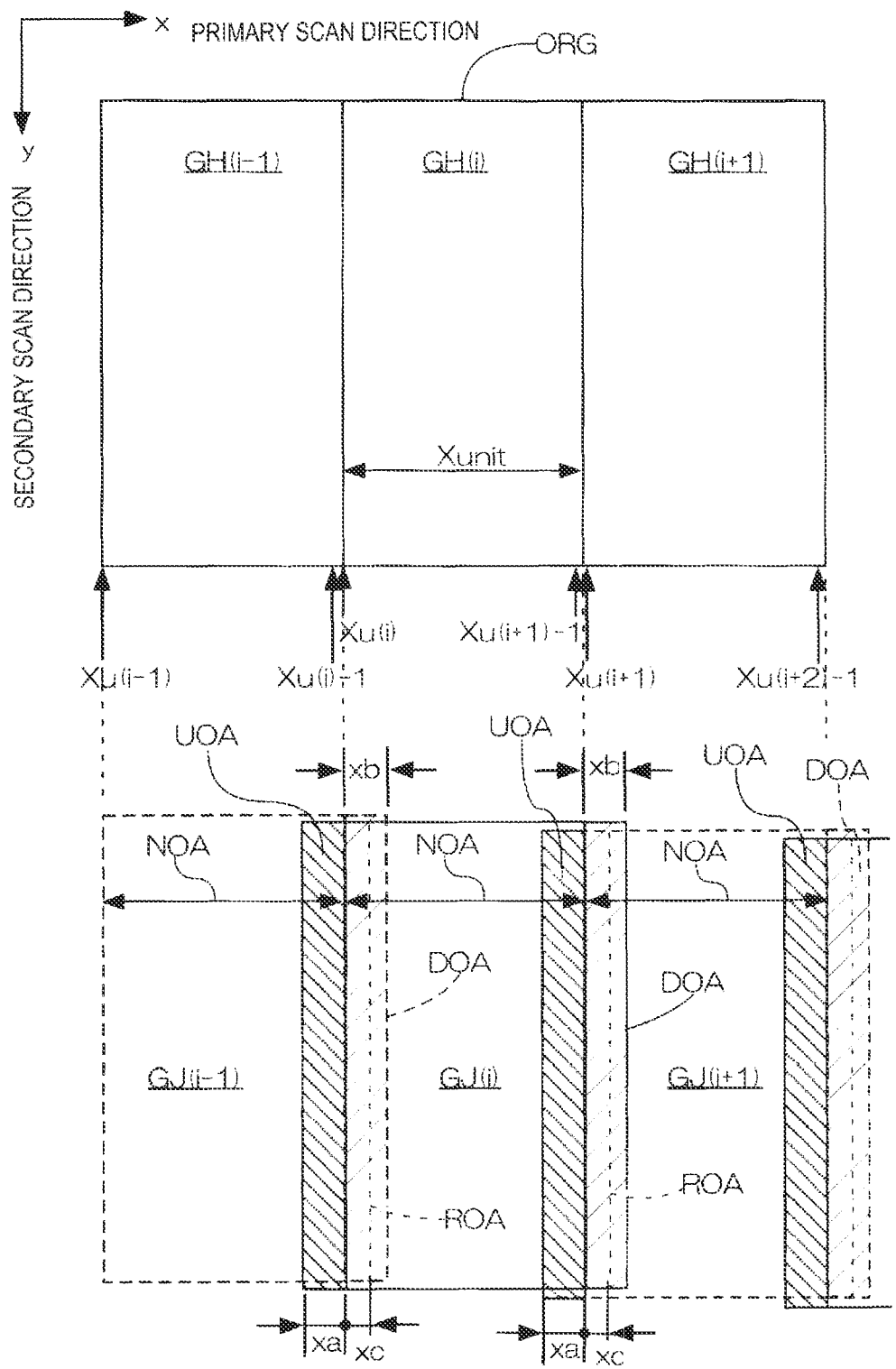
FIG. 10 is a descriptive diagram showing division of an original image in a third embodiment.

C. Third Embodiment (1) Basic Configuration:

The printer 20 including the image processing apparatus according to a third embodiment will next be described. The printer 20 has the same hardware configuration as that in the first embodiment shown in FIG. 1 but differs therefrom in terms of the range over which the original image ORG is divided and the halftone processing performed on the divided images. FIG. 10 shows the range of the divided images resulting from the division of the original image ORG. As shown in FIG. 10, the division of the original image ORG performed by the divider 41 in the third embodiment is so performed that each divided image GJ(i) includes the upstream overlapping segment UOA having the width corresponding to the pixels xa, as in the case of the divided images in the first and second embodiments shown in FIG. 3, and a downstream overlapping segment DOA having a width corresponding to pixels xb on the downstream of the normal segment NOA in the primary scan direction. A portion of the normal segment NOA that is the portion having a width corresponding to pixels xc and adjacent to the upstream overlapping segment UOA is referred to as a reference segment. The reference segment is part of the normal segment NOA. The divided images GJ(i) each processed by one Xu(i) unit therefore has, from the upstream, the upstream overlapping segment UOA—the normal segment NOA (including reference segment ROA)—the downstream overlapping segment DOA. The image processing in each of the segments will be described later.

Figure 11:
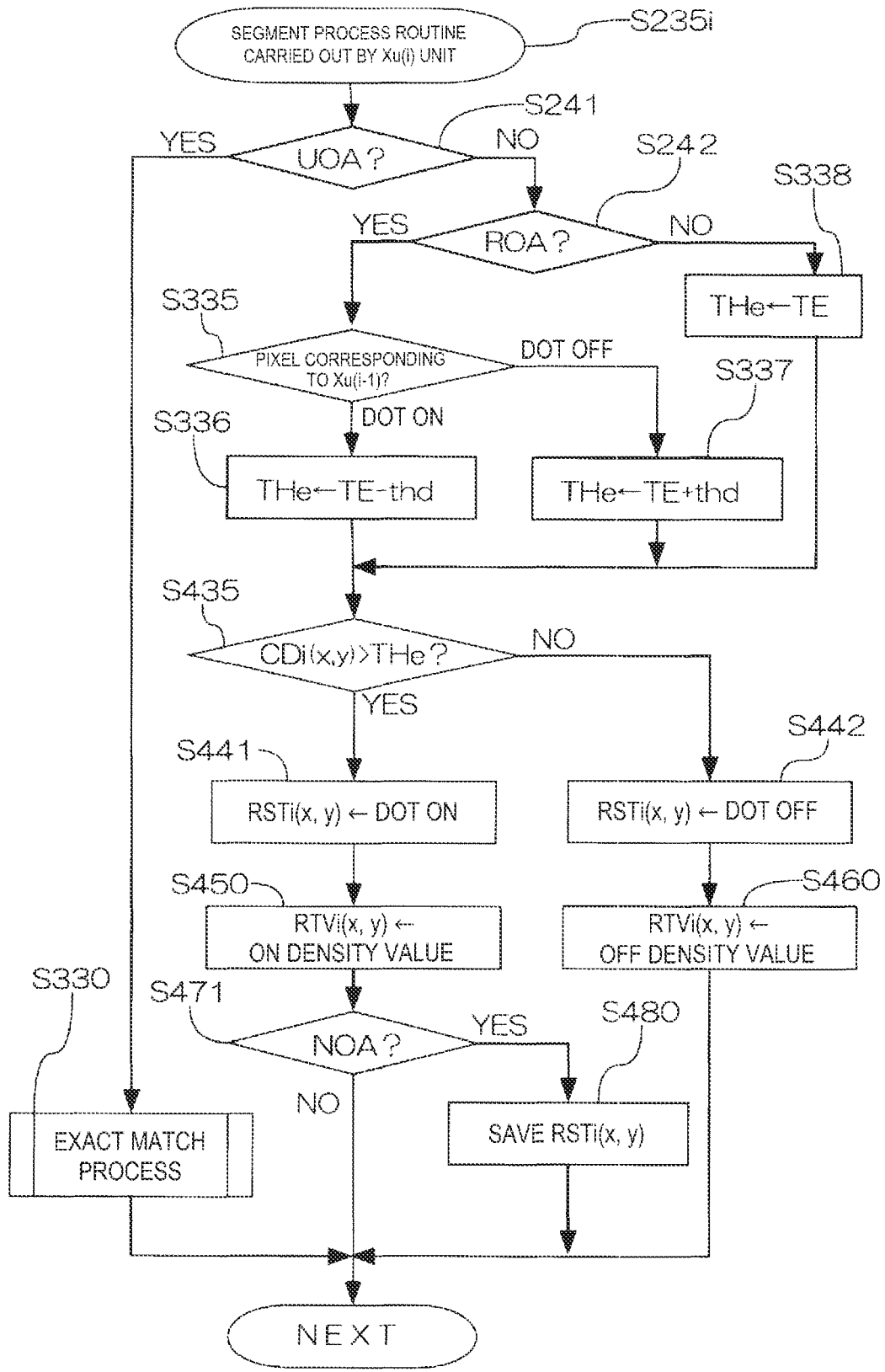
FIG. 11 is a flowchart showing the segment process routine carried out by the i-th unit in the third embodiment.

The image processing routine in the third embodiment is the same as that shown in FIG. 4, and the halftone processing performed by each of the processors is the same as the halftone processing routine performed by the Xu(i) unit in the second embodiment shown in FIG. 8 except for the segment binarization process (step S235i) performed by the Xu(i). FIG. 11 shows the segment binarization in the third embodiment. In the segment binarization (step S235i) in the third embodiment, the same processes as those in the segment binarization in the second embodiment (FIG. 9) have the same step numbers. The same processes will be described in a simplified manner.

Before the Xu(i) unit starts carrying out the segment binarization process shown in FIG. 11, the initialization process (steps S210i and S215i) has been carried out, completion of the y-raster process carried out by the Xu(i−1) unit has been ascertained (step S220i), and the gradation data DSi(x, y) has been acquired and the corrected gradation value data CDi(x, y) has been calculated (steps S221i and S222i), as shown in FIG. 8. The segment binarization process (step S235i) in the third embodiment is then carried out.

When the segment binarization process (step S235i) starts, it is first evaluated whether or not the pixel of interest OP(x, y) currently being processed belongs to the upstream overlapping segment UOA (step S241). When the coordinate x of the pixel of interest OP(x, y) falls within the range from −xa to −1, it is determined that the upstream overlapping segment UOA is the segment to which the pixel of interest OP(x, y) belongs ("YES" in step S241), and the exact match process described in the first embodiment (step S33 in FIG. 5) is carried out. The exact match process (step S330) is the process of matching the result of the processing based on the error diffusion method performed in the upstream overlapping segment UOA with the result of the processing performed on the corresponding segment of the upstream divided image GJ(i−1) adjacent to the upstream overlapping segment UOA. The process described above can be carried out because the segment binarization process (step S235i) has been carried out after the y-raster process in the upstream divided image GJ(i−1) adjacent to the upstream overlapping segment UOA was carried out in step S220i shown in FIG. 8. When it is determined that the pixel of interest OP(x, y) falls within the upstream overlapping segment UOA and the exact match process is performed, the control then exits to "NEXT", and the present routine is temporarily terminated.

When it is determined that the coordinate x of the pixel of interest OP(x, y) currently being processed belongs to a segment other than the upstream overlapping segment UOA, that is, the normal segment NOA or the downstream overlapping segment DOA ("NO" in step S241), it is further evaluated whether or not the coordinate x belongs to the reference segment ROA of the normal segment NOA (step S242). The Xu(i) unit, which performs the halftone processing, performs the processing while moving the pixel of interest sequentially from the coordinate −xa. Therefore, after the processing in the upstream overlapping segment UOA, the processing is performed on the pixels in the normal segment NOA and further on the pixels in the reference segment ROA of the normal segment NOA, as shown in FIG. 10. Specifically, in this case ("YES" in step S242), it is assumed that the result of the halftone processing performed by the Xu(i−1) unit, which processes the upstream divided image GJ(i−1), is referred to (step S335). When the result of the processing performed on a corresponding pixel shows that a dot is formed (dot on), the threshold THe is specified by Expression (4) below (step S336), whereas when the result of the processing performed on the corresponding pixel shows that no dot is formed (dot off), the threshold THe is specified by Expression (5) below (step S337).

$$THe \leftarrow TE-thd \qquad (4)$$

$$THe \leftarrow TE+thd \qquad (5)$$

The corresponding pixel referred to in the processes in steps S336 and S337 is a pixel in the downstream overlapping segment DOA of the upstream divided image GJ(i−1), as shown in FIG. 10. As a result, the result of the binarization evaluation in the subsequent step S435, that is, the result of the evaluation of whether or not the corrected gradation value data CDi(x, y) is greater than the threshold THe specified in advance is likely to match with the state, evaluated in step S335, of the corresponding dot formed by the upstream Xu(i−1) unit, whereby the matching rates in two results increases, as in the second embodiment.

On the other hand, it is determined that the pixel of interest OP(x, y) does not belong to the reference segment ROA of the normal segment NOA ("NO" in step S242), the threshold THe used for binarization evaluation is set at the reference threshold TE specified in advance (step S338). That is, in the reference segment ROA, the threshold THe is increased or decreased by the predetermined thd from the reference threshold TE (steps S336 and S337), whereas in the normal segment NOA or the downstream overlapping segment DOA other than the reference segment ROA, the threshold THe is set at the reference threshold TE (step S338), and the evaluation of the binarization of the pixel of interest OP(x, y) (step S435) is then performed.

In step S435, when the corrected gradation value data CDi(x, y) is greater than the threshold THe, it is determined that a dot is formed at the pixel of interest OP(x, y), the result value RSTi(x, y), which is the result of the halftone processing performed on the pixel of interest OP(x, y), is set at the value of 1 representing dot-on (step S441), and the assessment value RTVi(x, y) is further set at the dot-on density value (for example, value of 255) expected to be achieved by the dot formation (step S450). On the other hand, when the corrected gradation value data CDi(x, y) is smaller than or equal to the threshold THe, it is determined that no dot is formed at the pixel of interest OP(x, y), the result value RSTi(x, y), which is the result of the halftone processing performed on the pixel of interest OP(x, y), is set at the value of 0 representing dot-off (step S442), and the assessment value RTVi(x, y) is further set at the dot-off density value (for example, value of 0), which is expected to be achieved by no dot formation (step S460).

After the processes described above (steps S435 to S460), it is evaluated whether or not the pixel of interest OP(x, y) currently being processed belongs to the normal segment NOA (step S471), and when the pixel of interest OP(x, y) does not belong to the normal segment NOA, that is, when the pixel of interest OP(x, y) falls within the downstream overlapping segment DOA ("NO" in step S471), no action is performed, whereas when the pixel of interest OP(x, y) falls within the normal segment NOA ("YES" in step S471), the result value RSTi(x, y), which is the result of the processing performed by the Xu(i) unit, is saved in the RAM 45 (step S480). The result value RSTi(x, y) represents an image to be eventually printed, that is, the dot on/off on a pixel basis, and the downstream overlapping segment is determined by the X (i−1), which processes the upstream divided image GJ(i−1), so that the Xu(i) unit only performs the error calculation and the error diffusion in the downstream overlapping segment DOA and is not involved in the final dot on/off. In the upstream overlapping segment UOA, the exact match process (step S330) is performed as a result of the evaluation in step S240, so that the Xu(i) unit only performs the error calculation and the error diffusion and is not involved in the final dot on/off, as in the downstream overlapping segment DOA.

In the third embodiment described above, the divided images resulting from the division of the original image ORG into a plurality of images can be processed in parallel, as in the first and second embodiments, whereby the period required for the image processing of the entire original image ORG can be shortened, and the following effects are further provided.

Figure 12:
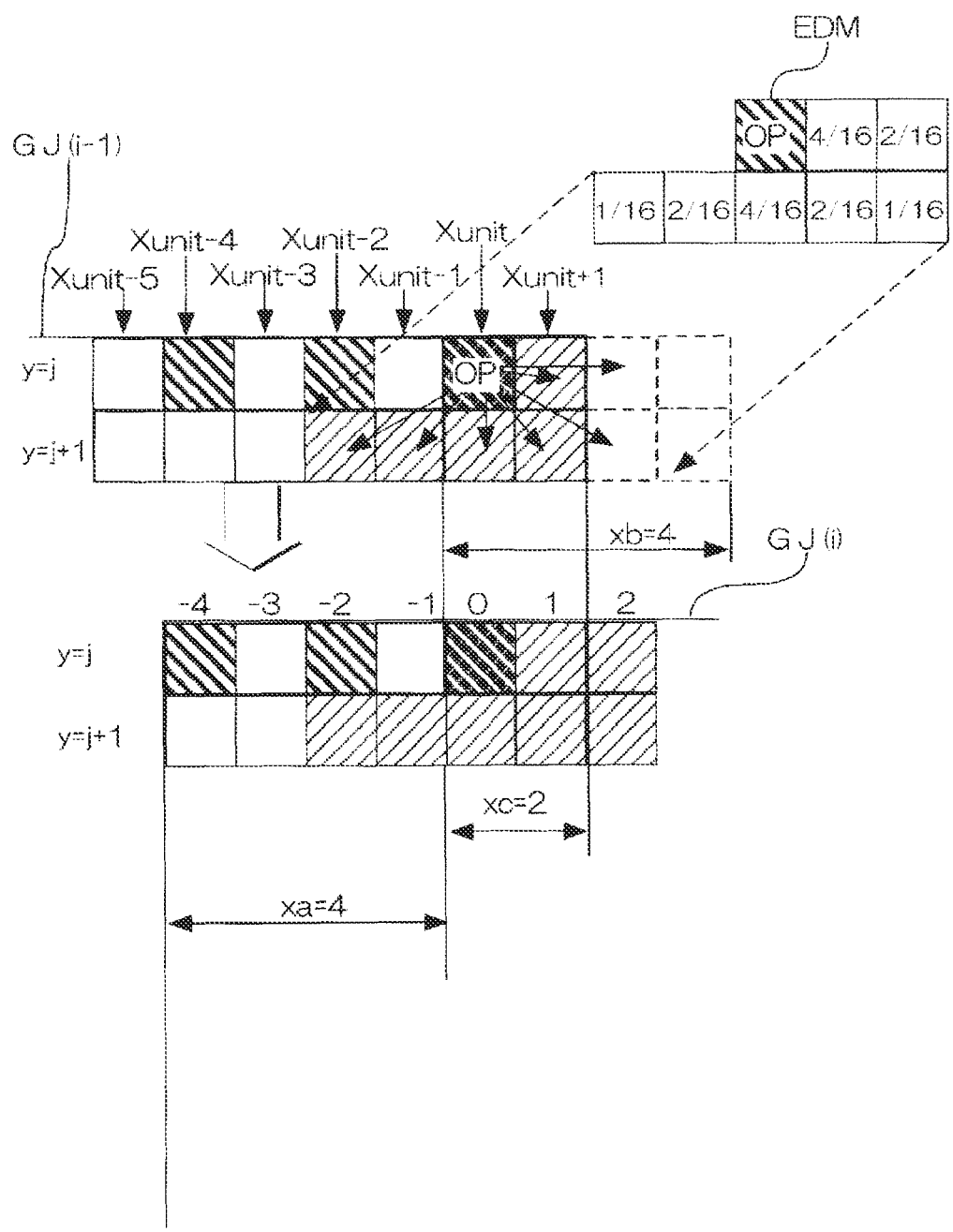
FIG. 12 is a descriptive diagram showing the error diffusion in a downstream overlapping segment.

[1] Since the downstream overlapping segment DOA is provided on the downstream of the normal segment NOA of the divided image GJ(i−1) in the primary scan direction, the error diffusion process is carried out beyond the boundary between the divided images GJ(i−1) and GJ(i). FIG. 12 shows the situation described above. In FIG. 12, the number of pixels xb in the downstream overlapping segment DOA is four, and the number of pixels xc in the reference segment ROA is two for convenience of illustration, but the numbers each only need to be greater than or equal to one. The preferable range may be determined in appropriate in accordance with the size of the original image, the width of the error diffusion range, and other factors. For example, the number of pixels xb, which is the width of the downstream overlapping segment DOA, ranges from about 4 to 32 pixels, preferably, from about 8 to 16 pixels. The number of pixels xc, which is the width of the reference segment ROA, ranges from about 2 to 16 pixels, preferably, from about 4 to 8 pixels.

As for the xb pixels in the downstream overlapping segment DOA, the corrected gradation value data CDi(x, y) is compared with the threshold THe (step S435), the dot on/off is determined (steps S441 and S442), and the assessment value RTVi is set (steps S450 and S460) in the same manner as in the normal segment NOA. As a result, the gradation error eri(x, y) is also diffused to the upstream pixel (x−2, y+1) and the pixel (x−1, y+1) on the raster line y+1 one raster line ahead of the pixel of interest OP(x, y) in accordance with the error diffusion mask EDM. As a result, a pixel that falls within the divided image GJ(i−1) and belongs to the normal segment NOA in the vicinity of the boundary between the divided images GJ(i) and GJ(i−1) reflects by a greater degree the gradation error eri(x, y) of a nearby pixel, whereby the quality of the image having undergone the halftone processing is further improved. Further, although having been already described, the result of the evaluation of the dot on/off in the downstream overlapping segment DOA (steps S441 and S442) is only computed but is not directly involved in the on/off of an actually printed pixel. However, since the result of the evaluation of whether or not a dot is formed in the downstream overlapping segment DOA (steps S441 and S442) takes over the result of the halftone processing based on the error diffusion method performed on the divided image GJ(i−1), the result of the evaluation of the dot formation in the downstream overlapping segment DOA is close to the result of the processing performed on the non-divided original image ORG. The effects and advantages [2] described below can therefore be provided.

[2] In the present embodiment, the Xu(i) unit, which performs the halftone processing on the divided image GJ(i), determines whether or not a dot is formed at a pixel in the downstream overlapping segment DOA. In the reference segment ROA, the Xu(i) unit facilitates the dot formation (steps S336 and S337) in accordance with whether or not a dot is formed (on/off) at the corresponding pixel in the divided image GJ(i−1). However, the dot formation at a pixel in the downstream overlapping segment DOA is not caused to exactly match with whether or not a dot is formed at the corresponding pixel in the divided image GJ(i−1), but the matching rate between the two formed dos is increased by increasing or decreasing the threshold THe by the predetermined thd from the reference threshold TE. As a result, the result of the evaluation of the dot formation at a pixel in the reference segment ROA in the upstream divided image GJ(i−1) is close to the result of the processing performed on the non-divided original image ORG, as described above in [1]. Therefore, when the result of the halftone processing is likely to match with the result of the halftone processing performed by the Xu(i−1) unit in the processing performed by the Xu(i) unit on the reference segment ROA, the dot formation in the divided image GJ(i−1) and the dot formation in the divided image GJ(i) across the boundary therebetween is further associated with each other, whereby the image quality can be further improved.

The effects and advantages can be provided as follows:

<1> In the halftone processing performed by the Xu(i−1) unit, the accuracy of the result of the evaluation of the dot formation in the upstream overlapping segment UOA and the subsequent downstream overlapping segment DOA is increased by continuously performing the error diffusion also in the downstream overlapping segment DOA increases; and <2> In the halftone processing performed by the Xu(i) unit, the dot formation in the upstream overlapping segment UOA is caused to 100% match (exactly match) with the dot formation at the corresponding pixel, which is the result of the halftone processing performed by the Xu(i−1) unit, and a low-match process of increasing the matching rate, although not 100%, is carried out in the subsequent reference segment ROA.

According to <1>, the result of the error diffusion in the segments described above approaches the result of the processing performed on the non-divided original image ORG, and according to <2>, the result of the processing performed on the normal segment NOA smoothly transitions to the result of the halftone processing performed by the Xu(i−1) unit on the divided image GJ(i−1) as the distance from the boundary increases in the normal segment NOA.

In the third embodiment, the exact match process (step S330) is carried out in the upstream overlapping segment UOA. Instead, the matching rate in the upstream overlapping segment UOA is not set at 100%, as in the second embodiment, and the amount of increase/decrease in the threshold THe may be so set that the threshold THe is increased or decreased to achieve a matching rate smaller than 100% but greater than or equal to a certain value in the upstream overlapping segment UOA, and the matching rate in the reference segment ROA is lower than the matching rate in the upstream overlapping segment UOA.

(2) Another Configuration 1:

In the basic configuration of the third embodiment described above, the reference segment ROA is provided, but the reference segment ROA may not be provided, and only the error diffusion process in the downstream overlapping segment DOA may be carried out. Also in this case, the error diffused by the halftone processing to the pixels in the vicinity of the boundary in the upstream overlapping segment UOA becomes more accurate, whereby the image quality in the vicinity of the boundary is improved.

(3) Another Configuration 2:

In the reference segment ROA in the basic configuration of the third embodiment, the threshold THe is uniformly increased or decreased in accordance with the dot on/off at the corresponding pixel, and the matching rate in the reference segment ROA may be so set as to be smaller than or equal to the matching rate at a pixel located at the rear end of the upstream overlapping segment UOA. Instead, the reference segment ROA may be divided into two or more segments, and the matching rate may be lowered by a greater degree in a region farther from the boundary between the divided images GJ(i−1) and GJ(i).

D. Other Embodiments

In addition to the first to third embodiments described above, embodiments described below are achievable. (1) As a first aspect of the present disclosure, there is provided an image processing apparatus that sequentially performs halftone processing on a two-dimensional original image extending in horizontal and vertical directions and formed of a plurality of pixels with one of the vertical and horizontal directions being a primary scan direction. The image processing apparatus includes a divider that divides the original image into n divided images (n is integer greater than or equal to 2) arranged in the primary scan direction, the divided images each having an upstream overlapping segment that overlaps with the divided image on the upstream in the primary scan direction by xa pixels (xa is integer greater than or equal to 1) arranged from a division position in each raster line along which pixels are arranged in the primary scan direction, n halftone processors that are provided in correspondence with the divided images, sequentially pick up as a pixel of interest each of the pixels that belong to each of the raster lines of the divided images, and apply an error diffusion method to the pixel of interest to perform the halftone processing, and an output section that combines results of the processing performed by the halftone processors on the divided images with one another and outputs processed data having gradation values smaller than gradation values of the original image. The halftone processor that processes the divided image on the downstream in the primary scan direction out of the n divided images starts, after the halftone processor that processes the upstream divided image adjacent to the downstream divided image performs the halftone processing on a pixel of the upstream divided image on a j-th raster line (j is integer greater than or equal to 1) in a secondary direction, the halftone processing on a pixel on the j-th raster line of the divided image to be processed and carries out, in the halftone processing performed on the pixel that falls within the upstream overlapping segment on the j-th raster line of the divided image to be processed, a match process of matching by a degree specified in advance the result of the halftone processing performed on the pixel with the result of halftone processing performed on the corresponding pixel out of the xa pixels on the j-th raster line of the upstream divided image adjacent to the downstream divided image.

According to the image processing apparatus, when the divided images resulting from the division of the original image into n images are processed in parallel the n processing units, the halftone processor that performs the halftone processing on the downstream divided image can start the processing only with delay corresponding to one raster line with respect to the halftone processor that performs the halftone processing on the upstream divided image. Therefore, when the original image is divided into n divided images, the halftone processing on the original image can be completed with delay of the processing period corresponding to minimum n raster lines. When the processing performed on the upstream overlapping segment is completed, error buffers for the first pixel processed by the downstream halftone processor take over a considerable portion of an error to be diffused from the upstream divided image. Therefore, the result of the halftone processing performed by the upstream halftone processor on the pixels in the upstream overlapping segment and the result of the halftone processing performed by the downstream halftone processor on the portion adjacent to the upstream overlapping segment and being the beginning of the portion processed by the downstream halftone processor are satisfactorily continuous to each other, and other effects and advantages can be provided. Further, in the halftone processing performed on the pixels that fall within the upstream overlapping segment on the j-th raster line of the divided image to be processed, the result of the halftone processing performed on the pixel of interest is caused to match with the result of halftone processing performed on the corresponding pixel out of the xa pixels on the j-th raster line of the upstream divided image adjacent to the downstream divided image, whereby occurrence of a pseudo-contour at the portion where an image is divided, occurrence of significant disturbance of the dot pattern, and occurrence of other phenomena can be suppressed.

The halftone processing based on the error diffusion method performed by each of the halftone processors is not limited to the processing on one raster basis and may be performed on a multiple raster basis. For example, when the halftone processors can each collectively process two raster lines, the downstream halftone processor can start the processing with delay corresponding to two raster lines with respect to the upstream halftone processor. Further, in this case, a configuration in which errors corresponding to two pixels on two raster lines are summed and then diffused may be employed to speed up the processing. Three or more raster lines may be processed as one unit in the first place.

The halftone processing performed by each of the halftone processors only needs to be based on the error diffusion method and does not necessarily employ a method for achieving binarization and may employ a method for achieving multi-value quantization, such as three-value or larger-value quantization. For example, a print controller 32 capable of forming large dots and small dots can create three states, "no dots are formed", "small dots are formed", and "large dots are formed", allowing three-value quantization. Further, a print controller 32 capable of forming large and small dots with the light cyan ink Lc and the light magenta ink Lm allows five-value quantization in total for the cyan ink C and the magenta ink M. In the case of multi-value quantization, such as three-value or larger-value quantization, for example, in the case of three-value quantization, it is assumed that a first threshold THe1 for the three-value quantization and a second threshold THe2 greater than the first threshold THe1 are specified from a first reference threshold TE1 and a second reference threshold TE2 greater than the first reference threshold TE1, the first and second reference threshold prepared as reference thresholds, and a first predetermined value thd1 and a second predetermined value thd2, which are predetermined values by which the reference thresholds are increased or decreased. Specifically, when the result of the halftone processing performed by the halftone processor on the upstream of the halftone processor that processes the pixel of interest shows that a large dot is formed, the second threshold THe2 is specified by subtracting the second predetermined value thd2 from the second reference threshold TE2, and the first threshold value THe1 is specified by subtracting the first predetermined value thd1 from the first reference threshold TE1. The corrected gradation value data CDi(x, y) is then sequentially compared with the second threshold THe2 and the first threshold THe1 to evaluate whether a large or small dot is formed. Similarly, when the result of the halftone processing performed by the halftone processor on the upstream of the halftone processor that processes the pixel of interest shows that a small dot is formed, the second threshold THe2 is specified by adding the second predetermined value thd2 to the second reference threshold TE2, and the first threshold value THe1 is specified by adding the first predetermined value thd1 from the first reference threshold TEL The corrected gradation value data CDi(x, y) is then sequentially compared with the second threshold THe2 and the first threshold THe1 to evaluate whether a large or small dot is formed. Therefore, even in the case of three-value quantization, the degree of matching the result of the dot formation with "a large dot", "a small dot", and "no dot" formed at a corresponding pixel can be increased.

In the multi-value quantization, such as three-value or larger-value quantization, using N types of dots (N is integer greater than or equal to three), halftone processing based on the error diffusion method may be performed on S dots (S is integer greater than or equal to 1 but smaller than or equal to N−1) sequentially from the smallest dot or the dot with the lowest density per unit area, and for each of the other dots, whether or not to form a dot may be determined based on the dither method.

The original image only needs to be divided by the divider into two or more divided images or may be equally or unequally divided in the primary scan direction. The original image may be divided along a line passing through a fixed position on the raster lines in the secondary scan direction or an oblique with respect to the raster lines, or the division positions may be shifted from each other on a raster line basis or on a multiple raster line basis. In the latter two cases, since the position of the boundary is shifted on a raster line basis or on a multiple raster line basis, it is difficult to visually recognize a pseudo contour or any other possible contour. When an image is not necessarily divided into rectangle images, the coordinates of the pixel at the processing start point in each raster line may be prepared in advance, for example, in the form of a table, and the processing may be started with reference to the table.

Figure 13:
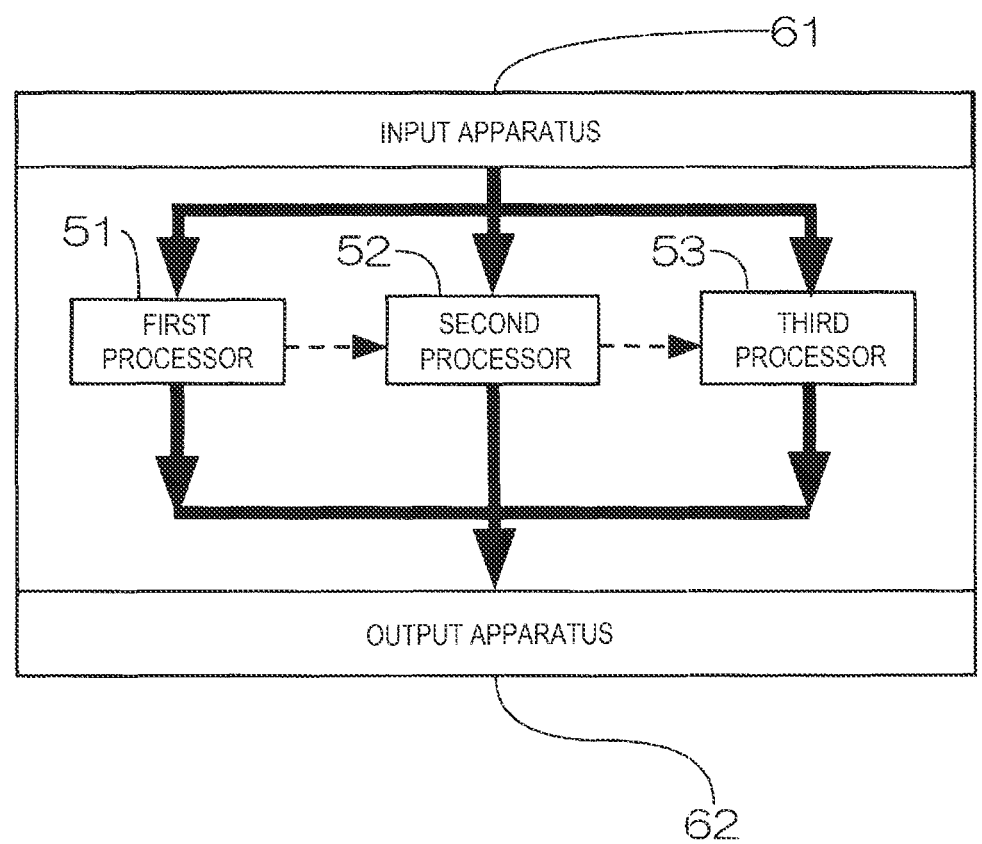
FIG. 13 is a descriptive diagram showing an example of the configuration of data exchange among processors.
Figure 14:
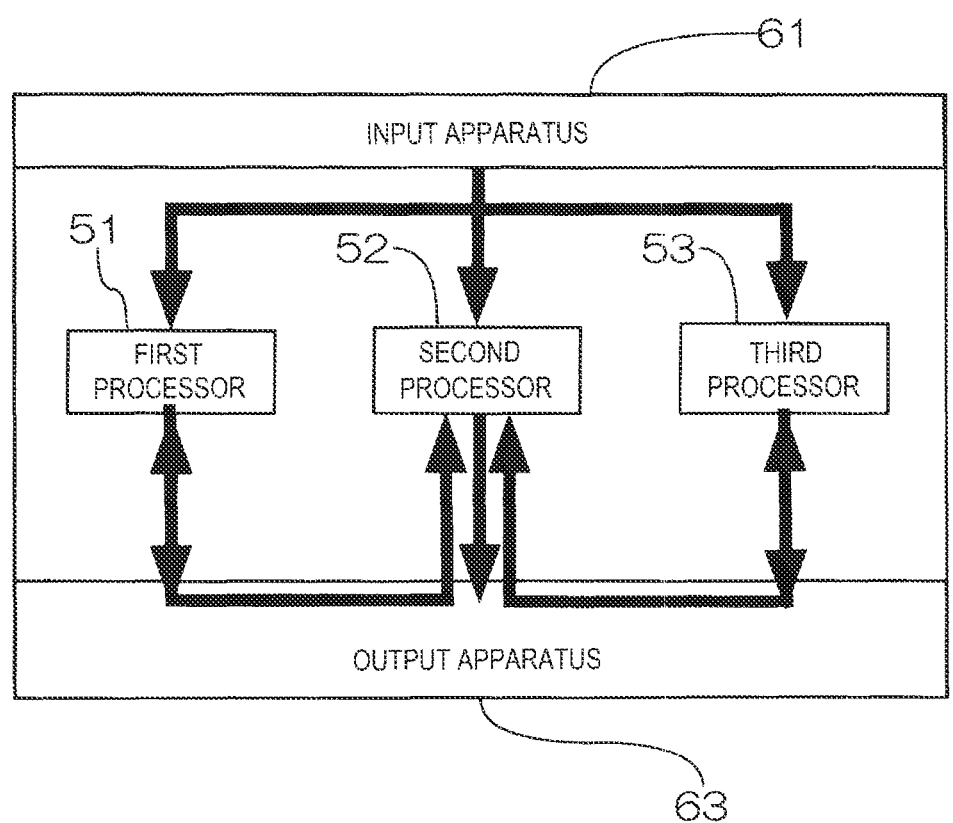
FIG. 14 is a descriptive diagram showing another example of the configuration of data exchange among the processors.
Figure 15:
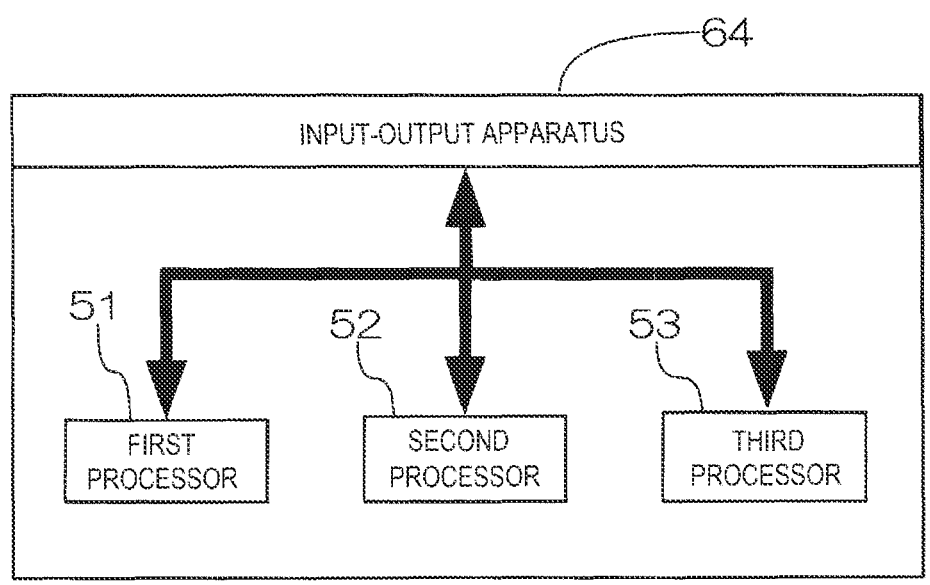
FIG. 15 is a descriptive diagram showing another example of the configuration of data exchange among the processors.

When the n halftone processors each perform the halftone processing on a pixel that falls within the upstream overlapping segment on the j-th raster line of the divided image to be processed, the n halftone processors acquire data representing the result of the halftone processing performed by at least the upstream halftone processor to carry out the match process of matching the result of the halftone processing on the pixel by a predetermined degree with the result of the halftone processing on the corresponding pixel in the xa pixels on the j-th raster line of the upstream divided image adjacent to the divided image to be processed. A variety of configurations can be employed for such data exchange between the halftone processors, as shown in FIGS. 13 to 15. FIGS. 13 to 15 each show a case where n=3, that is, first to third processors 51 to 53 are provided, but the number of processors is arbitrarily determined. In FIG. 13, the first to third processors 51 to 53 are each coupled to an input apparatus 61 and an output apparatus 62, and among the processors 51 to 53, the processors 52 and 53, which process a downstream divided image, are configured to be capable of referring directly to the results of the halftone processing performed by the processors 51 and 52, which process an upstream divided image, for example, via the shared memory 58.

In the configuration example shown in FIG. 14, the first to third processor 51 to 53 are each coupled to the input apparatus 61 and an output apparatus 63, and among the processors 51 to 53, the processors 52 and 53, which process a downstream divided image, are configured to be capable of referring to the results of the halftone processing performed by the processors 51 and 52, which process an upstream divided image, via the output apparatus 63.

In the configuration example shown in FIG. 15, the first to third processors 51 to 53 are each coupled to an input-output apparatus 64, which inputs and outputs data from and to an external apparatus, and among the processors 51 to 53, the processors 52 and 53, which process a downstream divided image, are configured to be capable of referring to the results of the halftone processing performed by the processors 51 and 52, which process an upstream divided image, via the input-output apparatus 64. In this case, the processors 51 to 53 each refer to the result of the halftone processing, for example, via an area so prepared in the RAM 45 as to store the result value RSTi. The configuration that allows the processors to refer to the results of the halftone processing is not limited in the first place to the configurations described above. For example, since the number of pixels to be referred to is approximately xa or xa+xb, a variety of configurations are employable, for example, a dedicated storage area is prepared, or the L2 cache in the CPU 40 is used.

The processors that perform the halftone processing described above each handle a small amount of data exchanged among the processors and are therefore readily achieved by hardware. In particular, a downstream processor does not refer to the cumulative errors dfi accumulated in the error buffers but refers to the result of the halftone processing, so that the amount of data to be acquired can be reduced. As a result, not only the configuration in which a plurality of halftone processors are provided in a multifunction apparatus but a configuration in which a plurality of halftone processors separately perform the halftone processing on a large original image in different apparatuses on a network and output the combination of the results of the halftone processing are also employable.

The output section combines the results of the processing performed by the halftone processors on the divided images with one another and outputs processed data having gradation values smaller than the gradation values of the original image, and a variety of printers and displays can be assumed as the destination of the output. The printer is not necessarily an inkjet printer and can be a laser printer or any of a variety of sublimation type printers.

(2) In the image processing apparatus described above, the aforementioned degree specified in advance in the match process may be the exact match. In the case of the exact match, the result of the halftone processing in an upstream overlapping segment can be taken over as it is, and the halftone processors can each start processing a segment to be processed, whereby the continuity between the processing of an upstream divided image and the processing of a downstream divided image can be enhanced.

(3) In the image processing apparatus described above, the match process described above may decrease a threshold used to evaluate whether or not a dot is formed at the pixel of interest in an error diffusion processing method in the halftone processors when the result of the halftone processing performed on the corresponding pixel in the overlapping xa pixels in the adjacent upstream divided image shows that a dot is formed whereas increasing the threshold when the result shows that no dot is formed. The configuration described above can also increase the degree of the matching. The degree of matching can also be readily adjusted by changing the degree that is decreased or increased. Instead of decreasing or increasing the threshold, smaller values and larger values of the threshold may be prepared in advance in the first place, and the threshold may be switched to any of the prepared values.

(4) In the image processing apparatus described above, the divider, when dividing the original image, may provide each of the raster lines of each of the divided images with a downstream overlapping segment that overlaps with the divided image on the downstream in the primary scan direction by a predetermined number of pixels from the division position, the predetermined number being xb (xb is integer greater than or equal to 1), and the halftone processors may each perform the halftone processing to which the error diffusion method is applied on the divided image including the downstream overlapping segment. The error diffusion can thus be continued beyond the boundary where the original image is divided, whereby the halftone processing performed on each pixel in the upstream overlapping segment can be made closer to the halftone processing performed when the original image is not divided. The number xb of pixels in the downstream overlapping segment only needs to be a value of 1, and may be an arbitrary number ranging, for example, from about 4 to 32 pixels, preferably, from about 8 to 16 pixels.

(5) In the image processing apparatus described above, the range of pixels which follow the upstream overlapping segment on the j-th raster line of the divided image to be processed and the number of which is xc smaller than or equal to the aforementioned number xb specified in advance (xc is integer greater than or equal to 1 but smaller than or equal to xb) may be defined as a reference segment, and the halftone processor that processes the divided image on the downstream in the primary scan direction out of the n divided images may carry out, in the halftone processing performed on a pixel in the reference segment, a low-match process of matching the result of the halftone processing performed on the pixel, by a degree lower than the degree of matching in the upstream overlapping segment, with the result of the halftone processing performed on a pixel in the downstream overlapping segment on the j-th raster line of the upstream divided image adjacent to the divided image to be processed. The continuity between the pixels having undergone the halftone processing can thus be further enhanced.

(6) In the image processing apparatus described above, the low-match process may cause, in the reference segment, the degree of matching in a first position away from the division position to be greater than the degree of matching in a second position further away from the division position. The degree of matching can therefore be preferably higher in a position closer to the division position.

(7) As a second aspect of the present disclosure, there is provided an image processing method for sequentially performing halftone processing on a two-dimensional original image extending in horizontal and vertical directions and formed of a plurality of pixels with one of the vertical and horizontal directions being a primary scan direction. The image processing method includes dividing the original image into n divided images (n is integer greater than or equal to 2) arranged in the primary scan direction, the divided images each having an upstream overlapping segment that overlaps with the divided image on the upstream in the primary scan direction by xa pixels (xa is integer greater than or equal to 1) arranged from a division position in each raster line along which pixels are arranged in the primary scan direction, performing halftone processing to which an error diffusion method is applied on each of the divided images in parallel, starting, in the halftone processing performed on the divided image on the downstream in the primary scan direction, after the halftone processing performed on a pixel of the upstream divided image adjacent to the downstream divided image on a j-th raster line (j is integer greater than or equal to 1) in a secondary direction, processing to which the error diffusion method is applied on the pixel on the j-th raster line of the divided image to be processed, carrying out, in the halftone processing performed on the pixel that falls within the upstream overlapping segment on the j-th raster line of the divided image to be processed, a match process of matching by a degree specified in advance the result of the halftone processing performed on the pixel with the result of halftone processing performed on the corresponding pixel out of the xa pixels on the j-th raster line of the upstream divided image adjacent to the downstream divided image, and combining results of the halftone processing performed on the divided images with one another and outputting processed data having gradation values smaller than gradation values of the original image.

The image processing method also allows the halftone processing to be performed in parallel without large delay and can suppress a decrease in image quality at the boundary where the original image is divided.

(8) In each of the embodiments described above, part of the configuration achieved by hardware may be replaced with software. At least part of the configuration achieved by software may be achieved by a discrete circuit configuration. When part or entirety of the functions in the present disclosure is achieved by software, the software (computer program) can be provided in the form of a computer readable recording medium that stores the software. The "computer readable recording medium" is not limited to a portable recording medium, such as a flexible disk and a CD-ROM, and includes an internal storage device in a computer, such as a variety of RAMs and ROMs, and an external storage device fixed to the computer, such as a hard disk drive. That is, the "computer readable recording medium" has a wide meaning including an arbitrary recording medium capable of permanently storing a data packet instead of temporal storage.

The present disclosure is not limited to the embodiments described above and can be achieved in a variety of configurations to the extent that they do not depart from the substance of the present disclosure. For example, the technical features described in the embodiments and corresponding to the technical features in the aspects described in the paragraph of Summary can be replaced with other features or combined with each other as appropriate to solve part or entirety of the problems described above or achieve part or entirety of the effects described above. Further, when any of the technical features have not been described as an essential feature in the present specification, the technical feature can be deleted as appropriate.

What is claimed is:

1. An image processing apparatus that sequentially performs halftone processing on a two-dimensional original image extending in horizontal and vertical directions and formed of a plurality of pixels with one of the vertical and horizontal directions being a primary scan direction,
    a divider that divides the original image into n divided images (n is integer greater than or equal to 2) arranged in the primary scan direction, the divided images each having an upstream overlapping segment that overlaps with the divided image on an upstream in the primary scan direction by xa pixels (xa is integer greater than or equal to 1) arranged from a division position in each raster line along which pixels are arranged in the primary scan direction;
    n halftone processors that are provided in correspondence with the divided images, sequentially pick up as a pixel of interest each of the pixels that belong to each of the raster lines of the divided images, and apply an error diffusion method to the pixel of interest to perform the halftone processing; and
    an output section that combines results of the processing performed by the halftone processors on the divided images with one another and outputs processed data having gradation values smaller than gradation values of the original image,
    wherein the halftone processor that processes the divided image on a downstream in the primary scan direction out of the n divided images
        starts, after the halftone processor that processes the upstream divided image adjacent to the downstream divided image performs the halftone processing on a pixel of the upstream divided image on a j-th raster line (j is integer greater than or equal to 1) in a secondary direction, the halftone processing on a pixel on the j-th raster line of the divided image to be processed and
        carries out, in the halftone processing performed on the pixel that falls within the upstream overlapping segment on the j-th raster line of the divided image to be processed, a match process of matching by a degree specified in advance a result of the halftone processing performed on the pixel with a result of halftone processing performed on a corresponding pixel out of the xa pixels on the j-th raster line of the adjacent upstream divided image.

2. The image processing apparatus according to claim 1, wherein the degree specified in advance in the match process is an exact match.

3. The image processing apparatus according to claim 1, wherein the match process decreases a threshold used to evaluate whether or not a dot is formed at the pixel of interest in an error diffusion processing method in the halftone processors when the result of the halftone processing performed on the corresponding pixel in the overlapping xa pixels in the adjacent upstream divided image shows that a dot is formed whereas increasing the threshold when the result shows that no dot is formed.

4. The image processing apparatus according to claim 1, wherein the divider, when dividing the original image,
    provides each of the raster lines of each of the divided images with a downstream overlapping segment that overlaps with the divided image on the downstream in the primary scan direction by a predetermined number of pixels from the division position, the predetermined number being xb (xb is integer greater than or equal to 1), and
    the halftone processors each perform the halftone processing to which the error diffusion method is applied on the divided image including the downstream overlapping segment.

5. The image processing apparatus according to claim 4, wherein a range of pixels which follow the upstream overlapping segment on the j-th raster line of the divided image to be processed and the number of which is xc smaller than or equal to the number xb specified in advance (xc is integer greater than or equal to 1 but smaller than or equal to xb) is defined as a reference segment, and
    the halftone processor that processes the divided image on the downstream in the primary scan direction out of the n divided images carries out, in the halftone processing performed on a pixel in the reference segment, a low-match process of matching a result of the halftone processing performed on the pixel, by a degree lower than a degree of matching in the upstream overlapping segment, with a result of the halftone processing performed on a pixel in the downstream overlapping segment on the j-th raster line of the upstream divided image adjacent to the divided image to be processed.

6. The image processing apparatus according to claim 5, wherein the low-match process causes, in the reference segment, the degree of matching in a first position away from the division position to be greater than the degree of matching in a second position further away from the division position.

7. An image processing method for sequentially performing halftone processing on a two-dimensional original image extending in horizontal and vertical directions and formed of a plurality of pixels with one of the vertical and horizontal directions being a primary scan direction, the image processing method comprising:

dividing the original image into n divided images (n is integer greater than or equal to 2) arranged in the primary scan direction, the divided images each having an upstream overlapping segment that overlaps with the divided image on an upstream in the primary scan direction by xa pixels (xa is integer greater than or equal to 1) arranged from a division position in each raster line along which pixels are arranged in the primary scan direction;

performing halftone processing to which an error diffusion method is applied on each of the divided images in parallel;

starting, in the halftone processing performed on the divided image on a downstream in the primary scan direction, after the halftone processing performed on a pixel of the upstream divided image adjacent to the downstream divided image on a j-th raster line (j is integer greater than or equal to 1) in a secondary direction, processing to which the error diffusion method is applied on a pixel on the j-th raster line of the divided image to be processed;

carrying out, in the halftone processing performed on the pixel that falls within the upstream overlapping segment on the j-th raster line of the divided image to be processed, a match process of matching by a degree specified in advance a result of the halftone processing performed on the pixel with a result of the halftone processing performed on a corresponding pixel out of the xa pixels on the j-th raster line of the upstream divided image adjacent to the downstream divided image; and combining results of the halftone processing performed on the divided images with one another and outputting processed data having gradation values smaller than gradation values of the original image.

\* \* \* \* \*